United States Patent
Malins et al.

(10) Patent No.: US 10,273,827 B2
(45) Date of Patent: Apr. 30, 2019

(54) INTEGRATED TURBOCHARGER CASTING

(71) Applicant: BorgWarner Inc., Auburn Hills, MI (US)

(72) Inventors: Simon Malins, Huddersfield (GB); Sean Rylance, Barnsley (GB); James Finley, Horsforth (GB); Rob Daniels, Brighouse (GB)

(73) Assignee: BorgWarner Inc., Auburn Hills, MI (US)

( * ) Notice: Subject to any disclaimer, the term of this patent is extended or adjusted under 35 U.S.C. 154(b) by 498 days.

(21) Appl. No.: 14/373,485

(22) PCT Filed: Jan. 17, 2013

(86) PCT No.: PCT/US2013/021848
§ 371 (c)(1),
(2) Date: Jul. 21, 2014

(87) PCT Pub. No.: WO2013/112345
PCT Pub. Date: Aug. 1, 2013

(65) Prior Publication Data
US 2014/0369811 A1    Dec. 18, 2014

Related U.S. Application Data

(60) Provisional application No. 61/672,525, filed on Jul. 17, 2012, provisional application No. 61/590,721, filed on Jan. 25, 2012.

(51) Int. Cl.
*F01D 25/18*    (2006.01)
*F01D 25/12*    (2006.01)
(Continued)

(52) U.S. Cl.
CPC ............ *F01D 25/186* (2013.01); *B22C 7/026* (2013.01); *B22C 9/046* (2013.01); *B22C 9/10* (2013.01);
(Continued)

(58) Field of Classification Search
CPC .... F01D 25/125; F01D 25/162; F01D 25/186; F01D 25/24; B22C 7/06; B22C 9/046;
(Continued)

(56) References Cited

U.S. PATENT DOCUMENTS 3,043,636 A * 7/1962 MacInnes ............. F01D 25/166 384/287
4,235,484 A * 11/1980 Owen .................... F01D 25/166 184/6.11

(Continued)

FOREIGN PATENT DOCUMENTS

JP    58157547 A    9/1983
JP    06292962 A    10/1994
(Continued)

OTHER PUBLICATIONS

Korean Office Action (with English language translation) dated Nov. 2, 2018, in Korean Application No. 10-2014-7022773.
(Continued)

*Primary Examiner* — Justin D Seabe
*Assistant Examiner* — Alexander A White
(74) *Attorney, Agent, or Firm* — Eric L. Doyle; Stephen A. Pendorf; Patent Central LLC

(57) ABSTRACT

A bearing housing, or integrated turbocharger housing, with the oil, and optionally air and water galleries, included as as-cast features, thereby avoiding the problems, design limitations and expense associated with conventional post-casting machining. The method of casting preferably uses lost foam casting, or a technique similar to lost foam casting
(Continued)

but in which a ceramic shell is formed on the foam form prior to metal casting, but can use any of a variety of casting techniques or a combination of two or more techniques.

11 Claims, 21 Drawing Sheets

(51) Int. Cl.

| | | |
|---|---|---|
| *F01D 25/16* | (2006.01) | |
| *F01D 25/24* | (2006.01) | |
| *F02C 6/12* | (2006.01) | |
| *B22C 7/02* | (2006.01) | |
| *B22C 9/04* | (2006.01) | |
| *B22C 9/10* | (2006.01) | |
| *F02B 39/14* | (2006.01) | |

(52) U.S. Cl.
CPC ......... *F01D 25/125* (2013.01); *F01D 25/162* (2013.01); *F01D 25/24* (2013.01); *F02C 6/12* (2013.01); *F02B 39/14* (2013.01); F05D 2220/40 (2013.01); F05D 2230/21 (2013.01); F05D 2240/52 (2013.01); F05D 2260/211 (2013.01); Y10T 29/4932 (2015.01)

(58) Field of Classification Search
CPC ... B22C 9/10; F02C 6/12; F02B 39/14; Y10T 29/4932; F04D 25/02; F04D 25/04; F04D 25/045; F05D 2230/21; F05D 2230/211; F05D 2240/52; F05D 2260/211
See application file for complete search history.

(56) References Cited

U.S. PATENT DOCUMENTS

| | | | |
|---|---|---|---|
| 4,585,396 A * | 4/1986 | Kawamura | F01D 5/025 416/241 B |
| 5,605,045 A * | 2/1997 | Halimi | F01D 5/085 310/52 |
| 2004/0000388 A1 | 1/2004 | Faraldi et al. | |
| 2005/0144946 A1* | 7/2005 | Claus | B22C 9/103 60/605.1 |
| 2005/0210875 A1* | 9/2005 | Larue | F16C 17/024 60/602 |
| 2006/0021731 A1* | 2/2006 | Strangman | B22C 9/12 164/138 |
| 2009/0238691 A1 | 9/2009 | Purdey | |
| 2010/0139270 A1 | 6/2010 | Koch et al. | |
| 2010/0175377 A1* | 7/2010 | Hippen | F02B 37/10 60/602 |
| 2011/0008158 A1* | 1/2011 | Boening | F01D 25/24 415/200 |
| 2011/0158803 A1 | 6/2011 | Sebald et al. | |

FOREIGN PATENT DOCUMENTS

| | | |
|---|---|---|
| JP | 2002129969 A | 5/2002 |
| JP | 2008196327 A | 8/2008 |
| KR | 20040002432 A | 1/2004 |
| WO | 2009013453 | 1/2009 |

OTHER PUBLICATIONS

"Lost Foam Inside", p. 1, 28-33, Aug. 2010, Paderborn, Germany. ISBN 978-3-9814770-0-9.

* cited by examiner

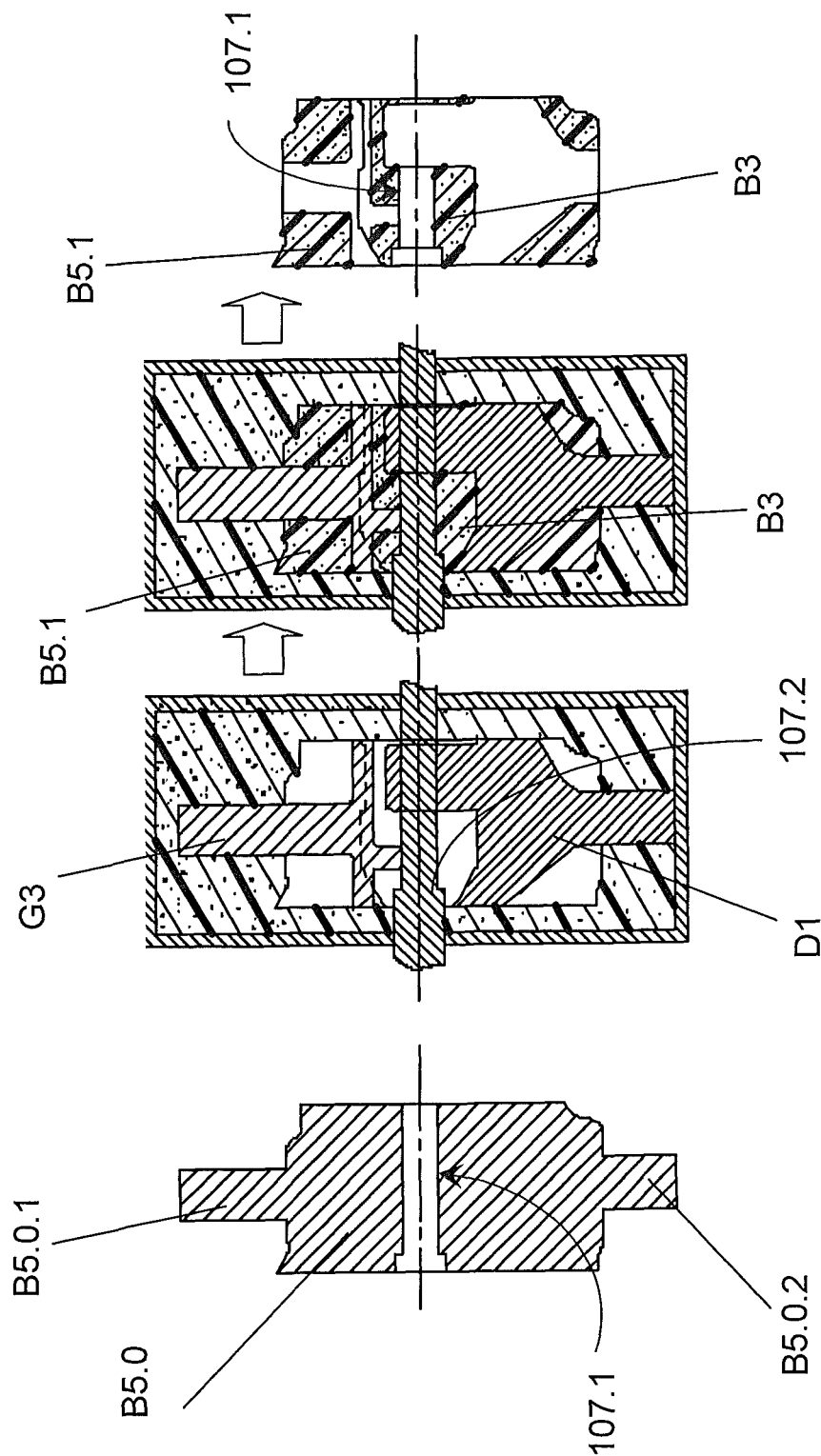

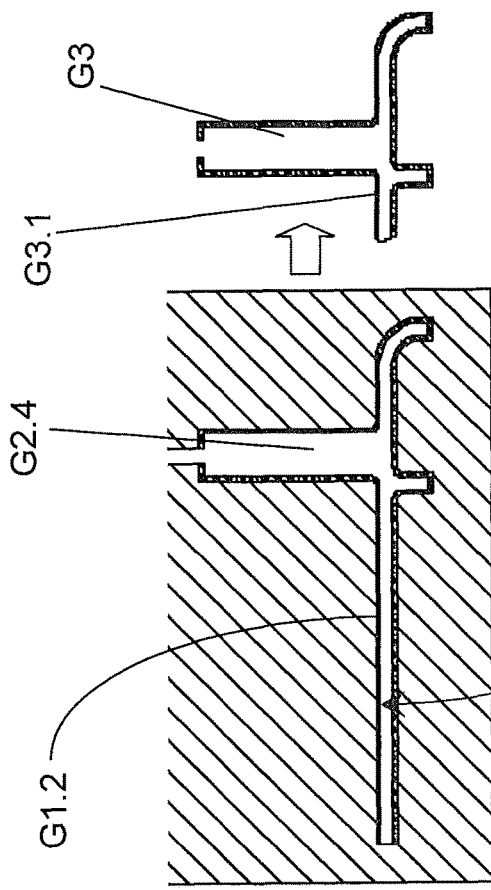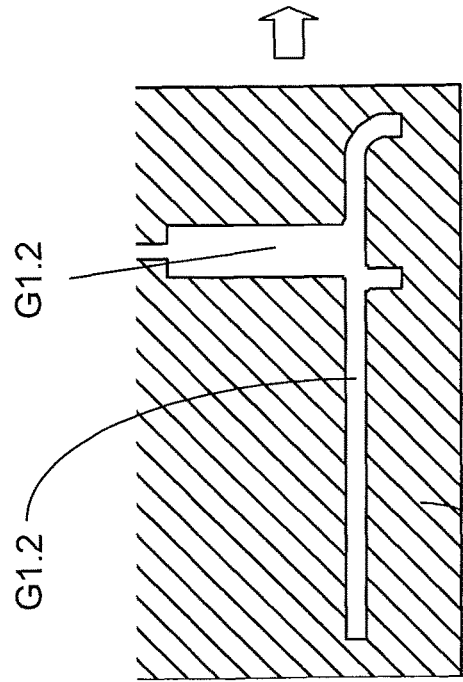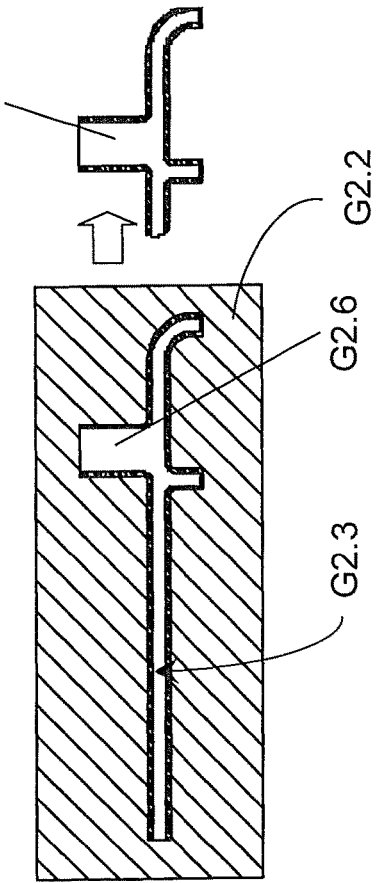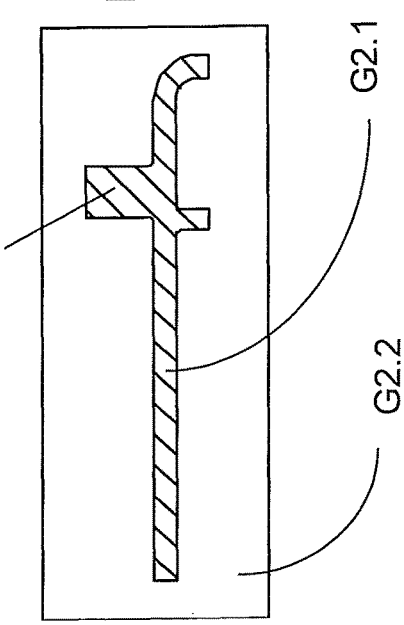
Fig. 17A
Fig. 17B

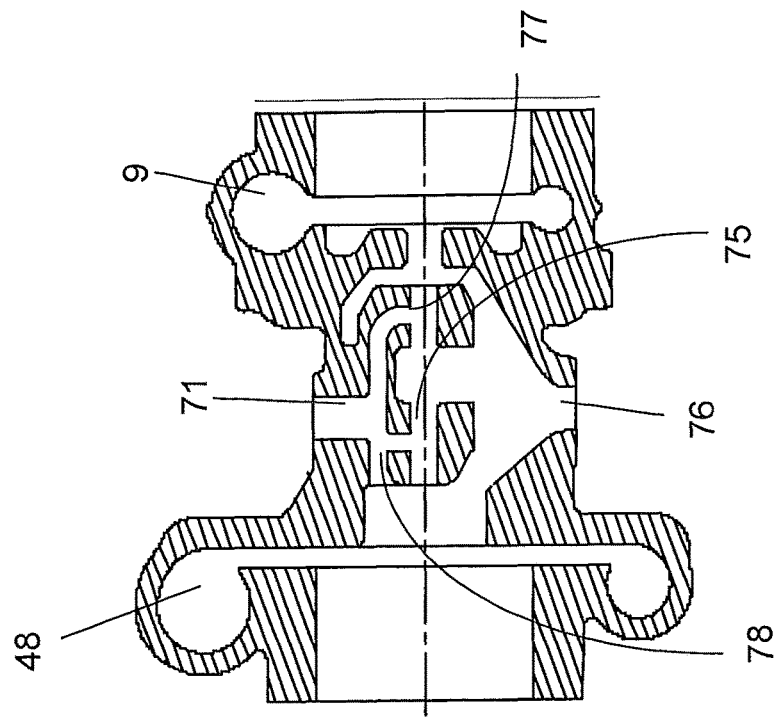
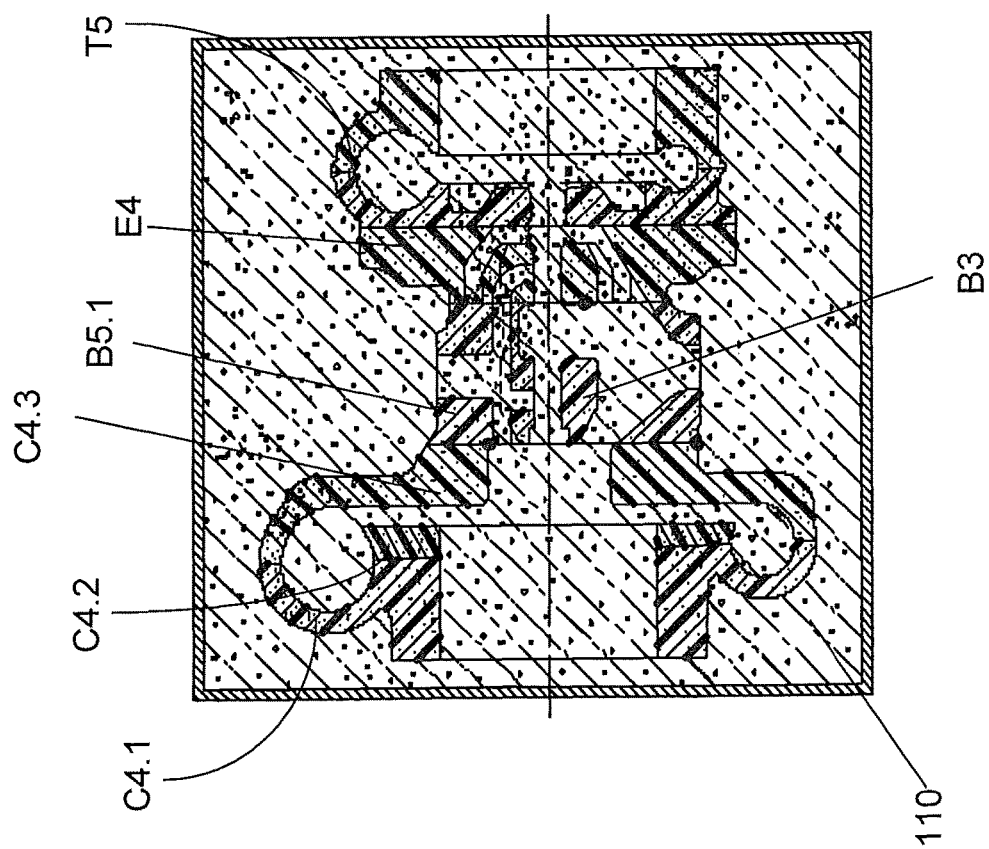
Fig. 19B
Fig. 19A

INTEGRATED TURBOCHARGER CASTING

BACKGROUND OF THE INVENTION

Field of the Invention

This invention relates to turbochargers, and in particular provides a low cost, high volume, integrated turbocharger housing casting, with accurately cast internal and external features. In particular, a bearing housing or integrated turbocharger housing is produced without the need for machining bearing housing oil galleries.

Description of the Related Art

Turbochargers are a type of forced induction system. They deliver air, at greater density than would be possible in the normally aspirated configuration, to the engine intake, allowing more fuel to be combusted, thus boosting the engine's horsepower without significantly increasing engine weight. A smaller turbocharged engine, replacing a normally aspirated engine of a larger physical size, will reduce the mass and can reduce the aerodynamic frontal area of the vehicle.

Turbochargers use the exhaust flow from the engine exhaust manifold to drive a turbine wheel (10). The energy extracted by turbine wheel is translated to a rotating motion which then drives a compressor wheel (40). The compressor wheel draws air into the turbocharger, compresses this air, and delivers it to the intake side of the engine. Housed inside a stationary housing is a rotating assembly consisting of the following major components: turbine wheel, compressor wheel, shaft upon which the turbine wheel and compressor wheel are mounted, flinger and thrust components. The shaft rotates on a hydrodynamic bearing system which is fed oil, typically supplied by an engine oil pump.

Commercially turbochargers are typically manufactured with five major components: turbine wheel, compressor wheel, turbine housing, compressor cover, and bearing housing. Some components can be standardized, others may be unique to particular applications. The bearing housing and the small parts which connect and support the rotating assembly are typically common to all turbochargers from a manufacturer within a given family size. The shaft, turbine wheel and compressor wheel are selected depending upon airflow requirements within a family. The compressor cover and turbine housing, on the other hand, are often unique for applications. For example, the "plumbing" architecture of a 10 liter engine from a manufacturer of an on-highway truck is often different from that of the same engine, from the same manufacturer, for an agricultural combine harvester. In the on-highway truck the exhaust may face rearwards. In the harvester, the exhaust may face forward. In the on-highway truck the air inlet and air cleaner may be in front of the engine, while in the harvester the air inlet and air cleaner may be beside the cab, to the rear of the engine. Accordingly, while the basic engine is the same, the turbocharger has to fit radically different engine architecture. To satisfy these requirements, the truck and harvester turbine housing and compressor covers may have different outlets, and invariably these covers have different orientation relative to both the bearing housing and relative to each other.

From a materials standpoint, a turbine housing for an on-highway truck may be subjected to cooling air with a velocity of approximately 50 mph, whereas, on the harvester, the air velocity may be minus 5 mph so the turbocharger heat rejection requirement is radically different as well.

As a consequence of these widely differing requirements and conditions, turbocharger manufacturers typically have different turbine housing and compressor covers on a common bearing housing and rotating assembly for different applications of what is basically the same engine.

Regarding the difference in orientation of the compressor cover and turbine housing discussed above, FIG. 2 depicts a scheme for defining or mapping the orientation of the housings. The bearing housing has to be oriented such that the oil drain (66) has an axis which is aligned with gravity to achieve the best oil draining performance possible—the closest approximation of which is that it is perpendicular to the engine crankshaft axis. So typically this vertical axis (100) is the datum for the orientation of the components. The turbine housing has to be rotated such that the foot (7), specifically the machined face (12) of the foot, mates with the complementary pad on the engine exhaust manifold. This then establishes the position of the turbine housing and bearing housing relative to the engine. Next, the compressor discharge is rotated about the bearing housing axis such that the compressor discharge aligns with the complementary ducting, typically to the intercooler. The features of the compressor inlet (49) have to connect with the ducting from the vehicle air filter and the exhaust downpipe has to connect with the turbine housing exhaust features (13).

As depicted in FIG. 2, a typical scheme for the orientation of the turbine housing (2) is an angle $\theta_t$, counter-clockwise from the turbocharger vertical axis (100), about the turbocharger axial centerline (1). A typical scheme for the orientation of the compressor cover (47) is an angle $\theta_c$, clockwise from the turbocharger vertical axis (100), about the turbocharger axial centerline (1).

By providing one of the bearing housing and end housings (turbine housing and compressor cover) with a pilot diameter or cylindrical recess, and providing a complementary cylindrical lip and flange on the mating part, these features being concentric about the bearing housing axial centerline, the features can be machined so that the components can be rotationally assembled and oriented by being rotated relative to the bearing housing. After orientation, the turbine housing or compressor cover is then rotationally constrained to the bearing housing by a vee band (following machining of the clamping interfaces) or a system of bolts and clamp plates. This allows for simple fixation of orientation of the end housings to the central bearing housing, but it means that a potential leak path of gases or particulate matter is omnipresent. It also means that additional hardware (vee-bands or bolts and clamp plates) have to be added to the bill of materials for the turbocharger assembly.

In U.S. Pat. No. 6,415,846 (O'Hara) the inventor teaches that an integrated turbocharger housing outer section be cast as one piece (with a large cylindrical internal void for insertion of inserts including bearing components for the rotating assembly), with the tooling mold (i.e., compressor end and turbine end) being designed to be rotated to allow for different orientations of the end housings. For high volume production this one-piece-casting can be used to minimize the number of housing castings, but in practice it still requires manual labor for assembly as the cast housing outer section does not include the internal rotating components or the bearing systems to support the rotating components.

In addition to the position of the machined surface (13) of the turbine foot (7), the location of the turbocharger, relative to the engine, is typically set by the position of a multi-plane datum of the exhaust manifold. The exhaust manifold foot fundamentally sets the position of the turbocharger, relative to the engine through the surface of the foot, which is often at a complexly defined "Z" axis, and the "X" and "Y" axes of the holes in the foot. As depicted in FIGS. 8A and 8B, bolt holes (8) in the turbine foot (7) set the "X' and "Y" position and the aforementioned machined surface (13) of the turbine foot sets the complex "Z" position of the turbocharger relative to the engine. Because of this, the position of other engine interface features (e.g., the compressor discharge, oil inlet, oil drain, compressor inlet, and exhaust downpipe interface) are dependant on this multi-plane datum. In addition to the position of the turbocharger on the engine, the datum established by the turbine housing foot can also be used to set the position of several critical features within the turbine housing, such as: machining of the face which sets the aerodynamic function of the turbine housing (with respect to the turbine and compressor wheels after assembly) and the alignment of the gas passage (14) through the turbine foot (7). The alignment of the latter is important in that the turbine gas passage must line up with the gas passage in the manifold or the hot exhaust gas will erode the turbine foot and potentially create a leak path from the exhaust passage within the turbocharger to the environment surrounding the turbocharger. The problem with this arrangement is that the machining of the foot details on the casting determine the (later) alignment of several aerodynamically critical features and it is difficult to establish these datum from a raw casting as explained below.

As depicted in FIGS. 7A and 7B, the placement of these turbine foot holes (8) is often one of the first machining operations, and much time is typically taken during machine tool set-up to locate the turbine housing in fixtures to ensure that these holes, and the machining of the face (12) of the foot, are machined in the appropriate place in all of the "X", "Y", and "Z" planes so that any machining downstream in the process is datumed correctly.

In a turbocharger, oil is typically fed from the engine oil pump, through a pipe or tube, to an oil fitting (69) which is mounted to a machined receptacle (61) in the top of the bearing housing. Oil is then fed, via oil bores, to the journal bearings and thrust bearing. An oil bore is an internal passageway in the bearing housing that conducts oil to key components such as the main bearings. Typically there is a major machined bore from the oil inlet, which then feeds a machined cross drilling (94), to directly feed the thrust bearing. Typically, intersecting the machined thrust bearing oil bore (94) are two machined bores (90), which feed the journal bearings.

The thrust bearing oil bore (94) is typically machined using a drill bit (95) along an axis (96) from the thrust bearing mounting face (85), perpendicular, or nearly perpendicular, to the thrust bearing face as that face is easily accessible by a machine tool. This method influences the size and design of the thrust bearing because the thrust bearing oil bore must intersect with the oil inlet major bore (61) and often provide the oil feed for the journal bearing oil bores (90T, 90C), as well as to fluidly connect with an oil bore feature within the thrust bearing.

The breakout and angle of the journal bearing feeds is more complicated. The machined oil bores (90T, 90C) for the journal bearings are typically machined via access through the relatively small diameter apertures in each end (compressor-end and turbine-end) of the bearing housing. On the turbine-end, the axis (92T) of the drill bit (91) is set by the need to guide the drill, and sometimes the drill plus the drill guide tooling, through the machining feature (62) for the piston ring boss on the nose of the bearing housing (60), while intersecting the journal bearing bore (65) as close as possible to the turbine-end of the bearing housing. On the compressor-end, the axis of the drill bit (91) is set by the need to guide the drill, and sometimes the drill plus the drill guide tooling, through the machining features for the bore (84) for the insert (50) and the much smaller bore (65) for the journal bearings, while intersecting the journal bearing bore (65) as close as possible to the thrust bearing mounting face (85) of the bearing housing.

These are very tricky machining feats, often requiring intricate tooling as the drill must first start, at a very shallow angle, at the correct place in the journal bearing bore and then break through the as-cast oil delivery bore.

Once machined, the areas in which the minor machined oil delivery bores breakout into the major gallery must be completely deburred to prevent metal burrs from entering the oil flow into tightly toleranced bearing clearances. Failure to deburr these areas well could result in a metal burr entering the bearing and destroying it.

As explained above, the different function of the compressor cover and turbine housing typically mean that they are manufactured using different materials. From a cost perspective, the material used is the lowest cost material which meets the technical requirements of the compressor or turbine stage ("stage" being the combination of rotating wheel and housing). For example: the exhaust gas in the turbine housing of a Diesel engine is approximately at 760° C. to 869° C., depending on the application, so the material of choice is typically high silicon molybdenum cast iron (HSM). The compressed air in the compressor cover usually has a maximum temperature of about 204° C., so cast aluminum is the most cost effective material.

Typically, the turbine housing, the bearing housing and the compressor cover are individually cast using the sand casting process. Some parts in high volume production, or parts which may require repetition of intricate features, may be cast using permanent mold or the Lost Foam Process (LFC). In any of these processes, there are multiple methods for producing the cores, forms, and patterns, into which, ultimately, the cast metal is poured.

Considering however the labor intensity and high level of skill required to machine each turbocharger housing component, the time and materials involved in orienting and assembling the components to form the turbocharger housing, and the soot and exhaust leakage inherent in the conventional turbocharger housing design, it can be seen that there exists the need for an improved method for the design of the turbocharger housings, the casting of the housings, and for machining the holes in the turbine foot and the oil galleries in the housing.

SUMMARY OF THE INVENTION

The present invention solves the above problems by casting a bearing housing, or more preferably an integrated, unitary housing, with the oil, and optionally air and water galleries, included as as-cast features, thereby avoiding the problems, design limitations and expense associated with conventional post-casting machining. The method of casting preferably uses lost foam casting, or a technique similar to lost foam casting but in which a ceramic shell is formed on the foam form prior to metal casting, but can use any of a variety of casting techniques or a combination of two or more techniques.

As explained above, typically, oil galleries are machined into castings, thus the placement and geometry of oil galleries has been dictated by drill access. This invention makes it possible to produce as casting features the galleries in the bearing housing of a turbocharger, thus freeing some design constraints due the need for tooling access to machine the oil bores. In fact, since drill access is no longer required, the invention is not limited to casting bearing housings, but can be used to cast entire integrated turbocharger housings, including turbine housing, compressor cover, and bearing housing with cast-in oil galleries and optionally air and water galleries.

The invention further encompasses a integrated turbocharger housing, including turbine housing, compressor cover, and bearing housing with cast-in oil galleries and optionally air and water galleries.

BRIEF DESCRIPTION OF THE DRAWINGS

The present invention is illustrated by way of example and not limitation in the accompanying drawings in which like reference numbers indicate similar parts, and in which:

FIGS. 16A,B depicts the process producing bearing support forms;

FIGS. 17A,B depict the process producing oil gallery cores;

FIGS. 19A,B depict the process for casting the integrated housing casting using a typical lost foam process;

DETAILED DESCRIPTION OF THE INVENTION

Figure 1:
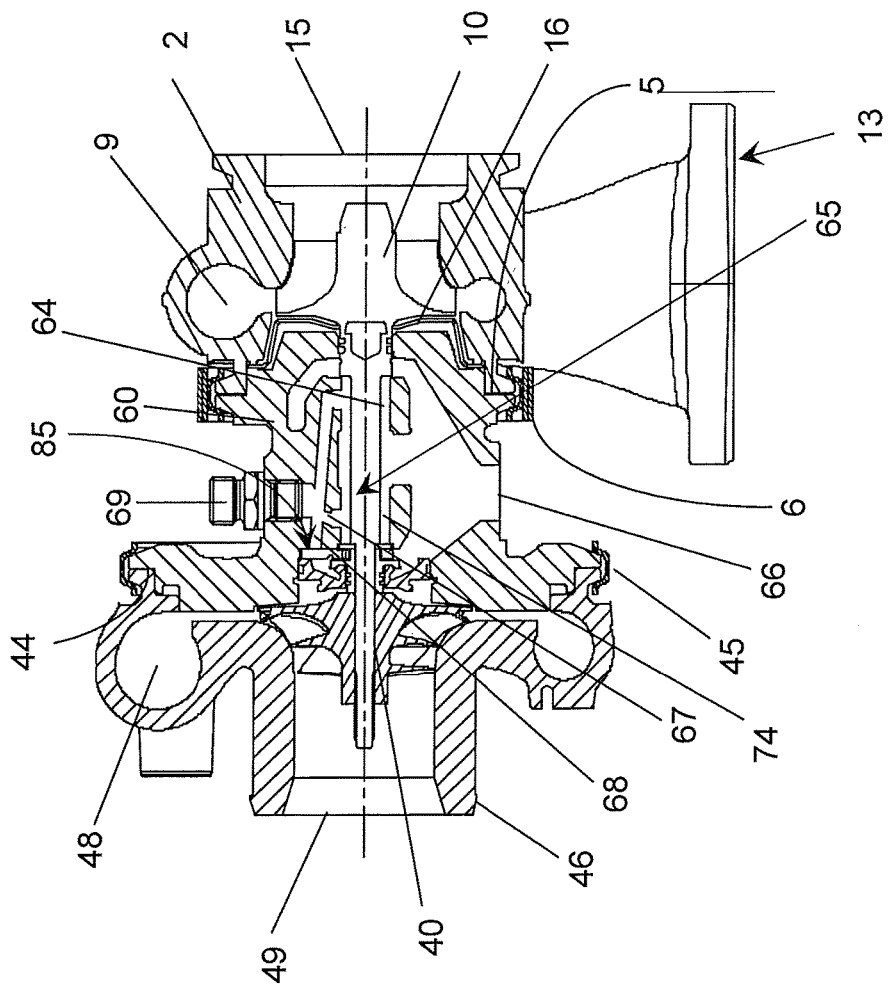
FIG. 1 depicts a section of a typical turbocharger.
Figure 4:
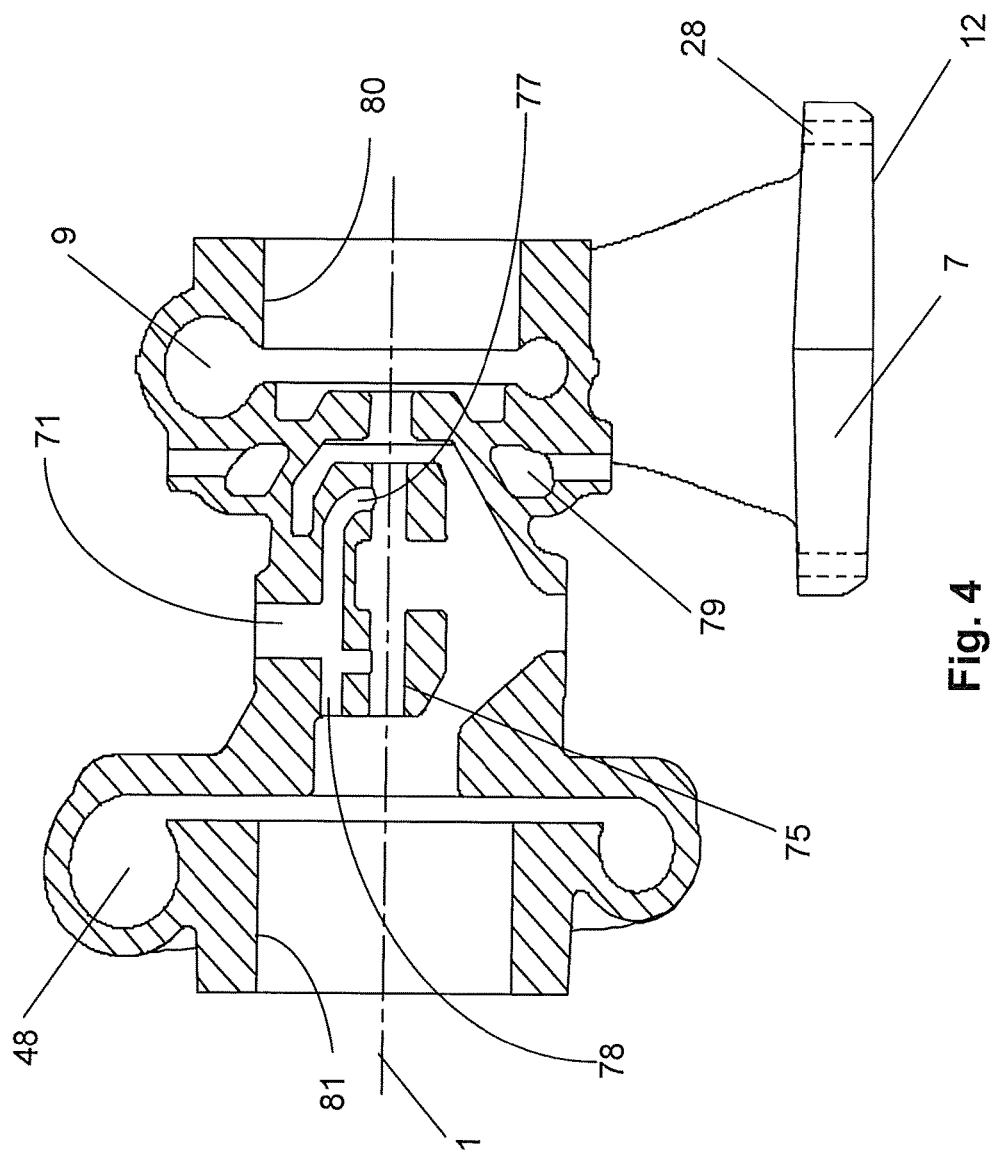
FIG. 4 depicts a section view showing the inventive integrated housing.
Figure 5:
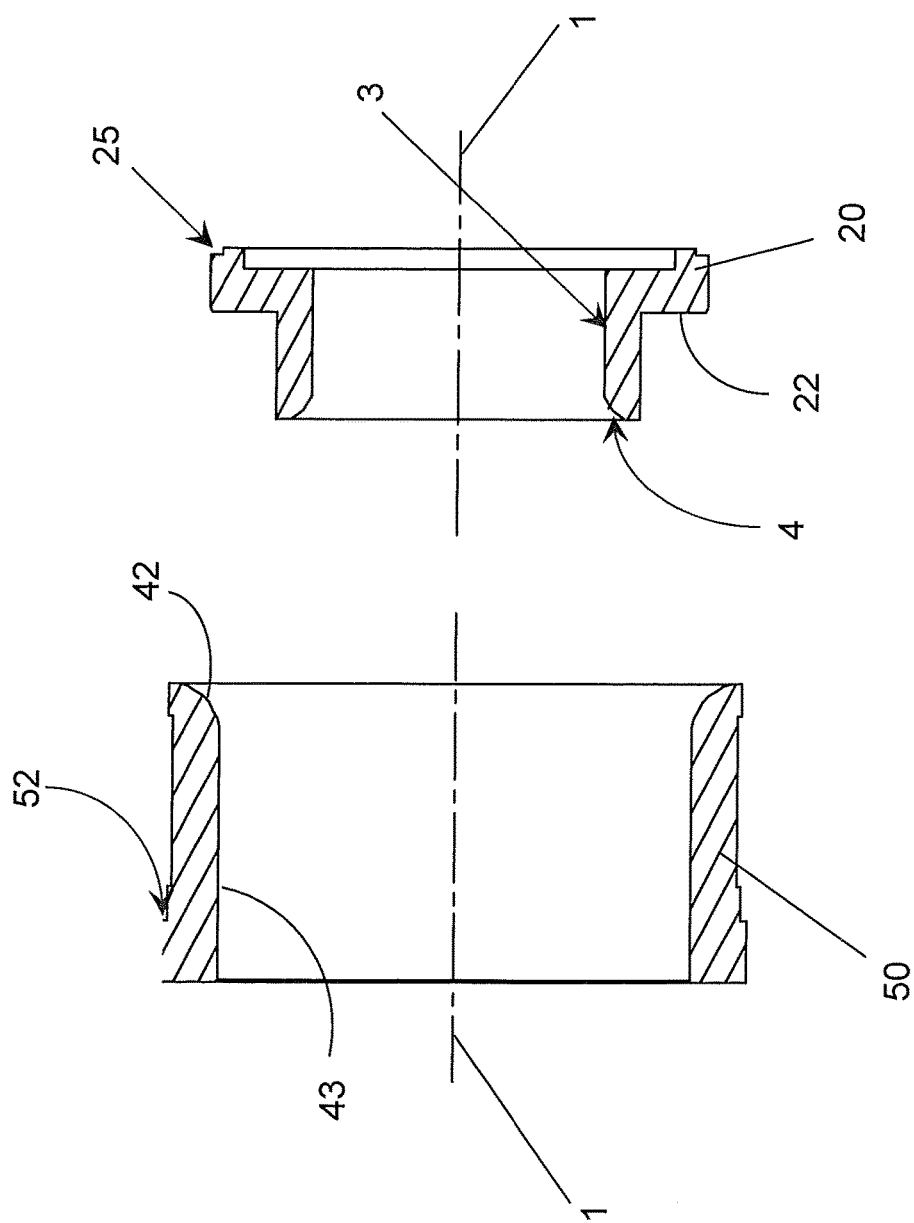
FIGS. 5A,B depict section views of inserts used in the inventive housing.

A first embodiment of the invention concerns a bearing housing adapted to be joined to a separately produced turbine housing on one side and a separately produced compressor cover on an opposite side. The internal oil galleries of the bearing housing may be produced using lost foam casting, or a technique similar to lost foam casting but in which a ceramic shell is formed on a foam form prior to metal casting; however, any of a variety of casting techniques or a combination of two or more techniques can be used. While the product shown in FIG. 4 is an integrated turbocharger housing wherein turbine housing, bearing housing and compressor cover are integrated, those working in this art will readily understand that the bearing housing can be manufactured as one of the parts of a three piece housing, as shown in FIG. 1. However, in contrast to the prior art bearing housing shown in FIG. 1, wherein the oil galleries are machined and thus straight and located where a drill may gain access, the inventive bearing housing section has cast-in oil galleries, which can be freely located and freely shaped, e.g., curved. By then simply machining the main bearing bore (65) for the rotating assembly into the cast bearing housing, the generally radial inner ends of the cast-in oil galleries (77) are fluidly connected to the areas which house the journal bearings. In a manner similar to that described for the journal bearing oil galleries, it is merely necessary to machine the face (85) upon which the thrust bearing (35) is axially located, to connect the cast-in thrust bearing oil gallery (78) to the canal (36) of the thrust bearing (35). This bearing housing with cast-in galleries is then assembled with rotating assembly, compressor cover part and turbine housing part to form a complete turbocharger.

FIG. 4 depicts the integrated turbocharger housing, which incorporates an as-cast port (71) for the oil inlet. The as-cast oil inlet (71) fluidly connects to an as-cast thrust bearing oil gallery (78), which fluidly connects the thrust bearing area with said as-cast oil inlet. A single, or pair, of as-cast journal bearing oil galleries (77) fluidly connect the areas of a pair of journal bearings with said as-cast oil inlet (71). The as-cast journal bearing oil galleries (77) can either fluidly connect to the thrust bearing oil gallery (78) or fluidly connect directly to the oil inlet (71). For clarity, the use of the term "area" signifies that, when machined, the "area" will house the thrust bearing (74) or the journal bearings (64) respectively when the turbocharger is assembled.

As explained above, the contemporary method for the fabrication of the journal bearing oil galleries requires a drill and extensive tooling to machine the galleries. Since the access for the drill is limited to a relatively small diameter journal bearing bore (65), this in turn meant that the journal-bearing-bore-end of each journal bearing oil gallery had to be located such that a drill and tooling could access the start of the oil gallery bore through the journal bearing bore. This procedure is not only difficult, it necessitates using intersecting straight drilled bores.

In comparison, it is an important contribution of the inventive method that the oil galleries are not drilled and can now be curved, with no sharp corners, thus minimizing flow losses. Further, the journal-bearing-bore-end of each journal bearing oil gallery can be placed independent of machining constraints. Since the oil inlet to the journal bearing is part of the design constraint which determines the axial centerline of the journal bearing position, this constraint is removed, allowing the journal bearings to be placed by shaft dynamics logic rather than machining requirements. The present as-cast oil galleries require no finish machining.

In addition to the as-cast oil galleries, an air gap gallery (79) may also be cast to minimize the conductive heat path from the areas subjected to exhaust gas to the areas such as in the bearings and compressor stage, which should remain as cool as possible. This further feature may also mean that the integrated housing can run without a turbine heat shield.

The casting can be investment casting, wherein a mold is formed around a sacrificial pattern made of wax, or can be lost-foam casting (LFC), a type of evaporative-pattern casting process explained in greater detail below, or can be any combination of casting techniques known to the person of ordinary skill in this art. LFC casting is well known as evident from, for example, U.S. Pat. Nos. 4,657,063; 4,768,567; 4,986,942; 6,889,742 and 7,287,571. Metals that can be cast using the LFC technique include cast irons, aluminum alloys, steels, and nickel alloys; less frequently stainless steels and copper alloys are also cast. The term "fugitive pattern" will be used to refer to any pattern formed from a fugitive material such as wax, plastic, or foam, that at one time during the mold making process defines a shape, but is displaced (melted out, burned out, volatilized, etc.) as part of the casting process.

Since the galleries can be cast into the bearing housing, eliminating the need to provide access for drilling bores in the bearing housing, it becomes possible to produce a integrated turbocharger housing by modifying the design of the turbine housing and/or compressor cover to provide end-closure elements (20, 50) to be fitted to the ends of the housing after assembly of the rotating elements (compressor wheel, turbine wheel, shaft and bearings). The bearing housing section in the inventive integrated housing features as-cast oil galleries (71,77,78) as in the first embodiment, and is formed by a casting process that can tightly control the positional and dimensional accuracy and surface finish similar to that of the lost foam process. In a manner similar to that used for the formation of the oil galleries, the features on the turbine foot or compressor outlet can also be cast with tightly controlled positional and dimensional accuracy and surface finish. The inventive integrated housing may also feature as-cast air gap cores to minimize heat transfer from the turbine housing to the bearing housing.

Figure 2:
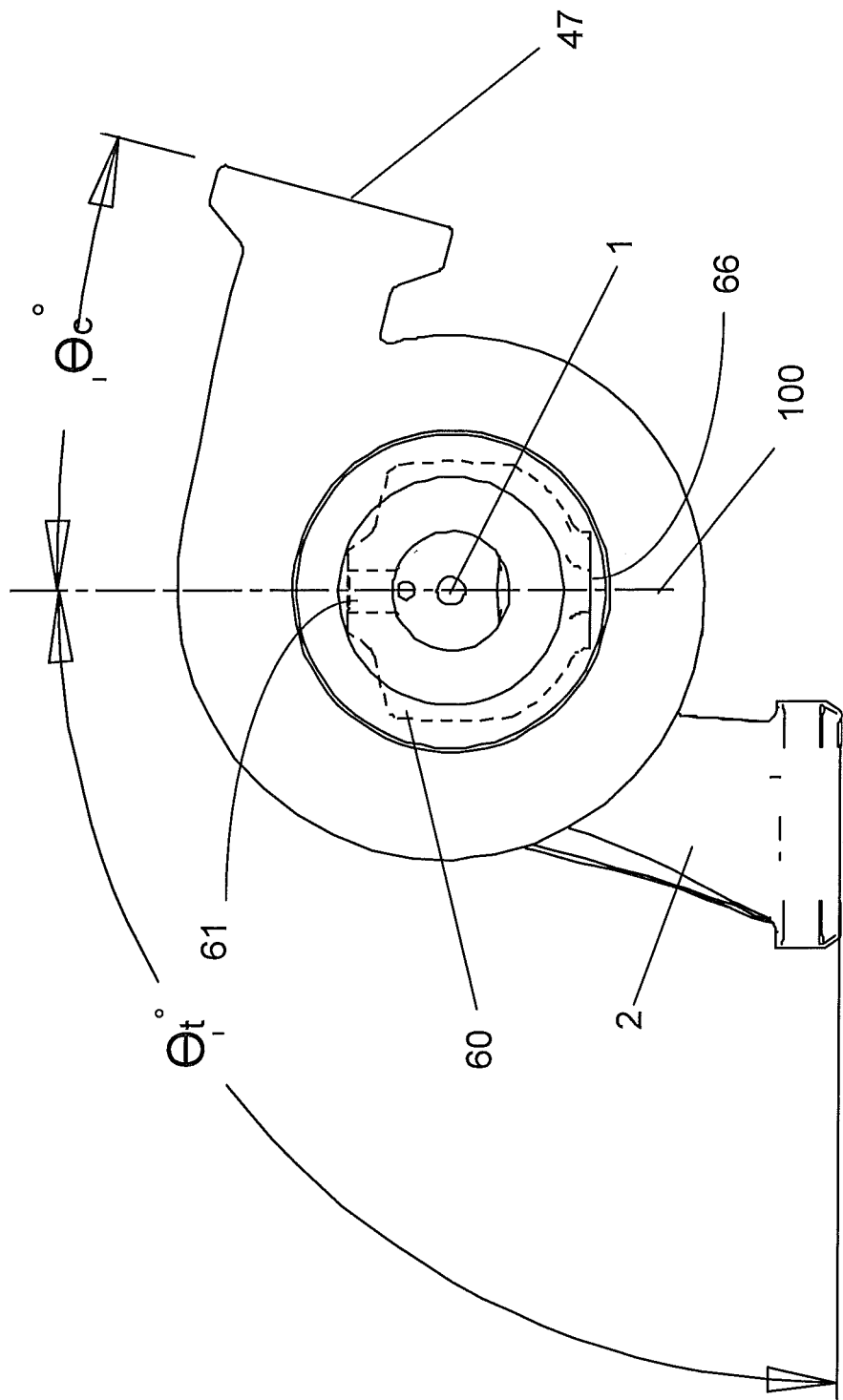
FIG. 2 depicts a view of a typical turbocharger orientation scheme.
Figure 3:
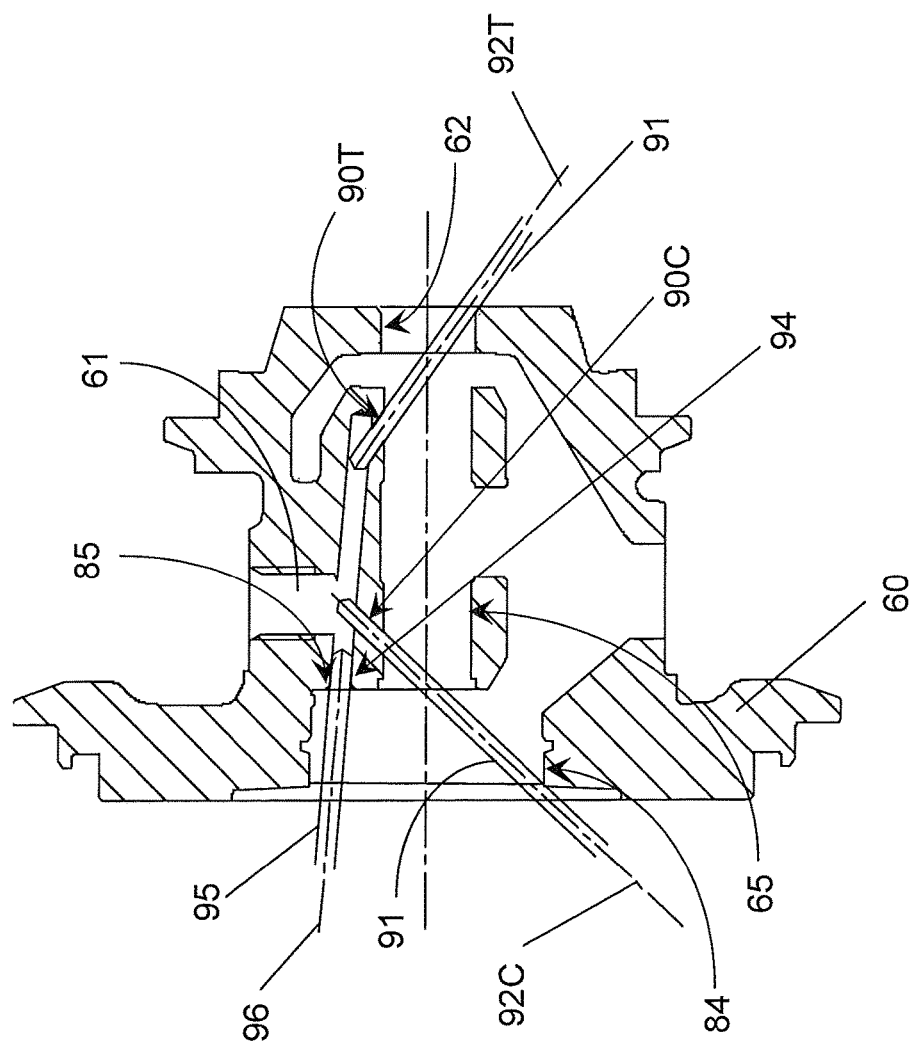
FIG. 3 depicts a section view of the drilled oil gallery scheme.

In the second embodiment of the invention, as depicted in FIGS. 4, 5, 6, and 7, the turbine housing, bearing housing and compressor cover are cast as a single, integrated turbocharger housing with the orientation of the turbine housing section fixed relative to that of the bearing housing section, and the orientation of the compressor cover section also fixed relative to that of the bearing housing section. The bearing housing section orientation is such that the oil drain points to earth so that gravity aids in the draining of oil from the bearing housing to the engine. The orientation of the end-housings is such that they satisfy the requirements of the engine upon which the turbocharger is located and the under-hood vehicle architecture in which the engine is mounted (for example the location of the intercooler). In FIG. 2, the orientation of the turbine housing is depicted as the angle $\Theta_t°$, counterclockwise. The orientation of the compressor cover is depicted as angle $\Theta c_t°$ in a clockwise direction. Both orientations are to the vertical axis (100), with the bearing housing drain (66) facing down.

The integrated housing is machined in several areas. The as-cast turbine housing exit (80) is machined to receive a turbine-end insert (20). The as-cast compressor cover inlet is machined to receive a compressor-end insert (50). The as-cast bearing bore (75) is machined to produce a journal bearing bore (65) with its associated features. An as-cast oil inlet (71) is machined to receive the oil fitting (69). An as-cast oil drain (66) is also machined to receive the pipe which fluidly couples the oil drain to the engine.

As depicted in FIG. 5A, the compressor-end insert features a profile (42) which will become part of the compressor cover profile (which complements the compressor wheel profile) when the insert (50) is assembled to the housing and an abutment (52) which complements an abutment (83) in the integrated housing and sets the axial position of the compressor-end insert (50) and its associated features relative to the integrated housing. The inner surface of the insert features a shape which will become the compressor inlet (43) when assembled to the integrated housing.

As depicted in FIG. 5B, the turbine-end insert features: a profile (4) which will become part of the turbine housing profile (which complements the turbine wheel profile) when the insert is assembled to the housing, and an abutment (22) which complements an abutment (82) in the integrated housing and sets the axial position of the turbine-end insert (20) and its associated features relative to the integrated housing. The inner surface of the insert features a shape which will become the turbine exducer (3) when assembled to the integrated housing. In cases in which a pilot for the exhaust downpipe, which connects the turbine exhaust to the vehicle, is required, a small relief (25) may be cut into the turbine-end of the insert to provide a surface upon which the material generated by a constraining stake (24) may be pushed.

Figure 6:
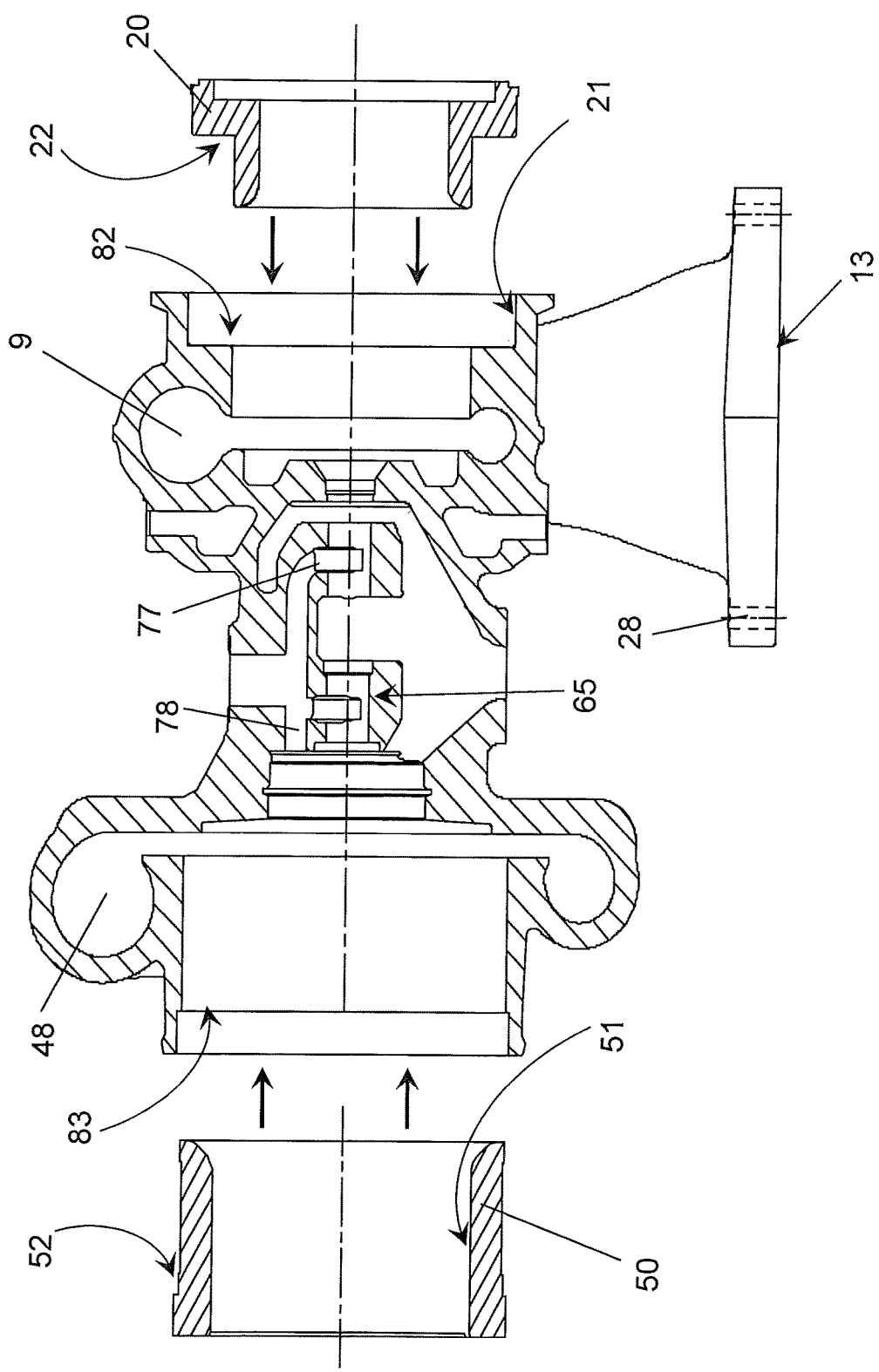
FIG. 6 depicts a section view showing how the inserts fit to the inventive integrated housing.
Figure 7:
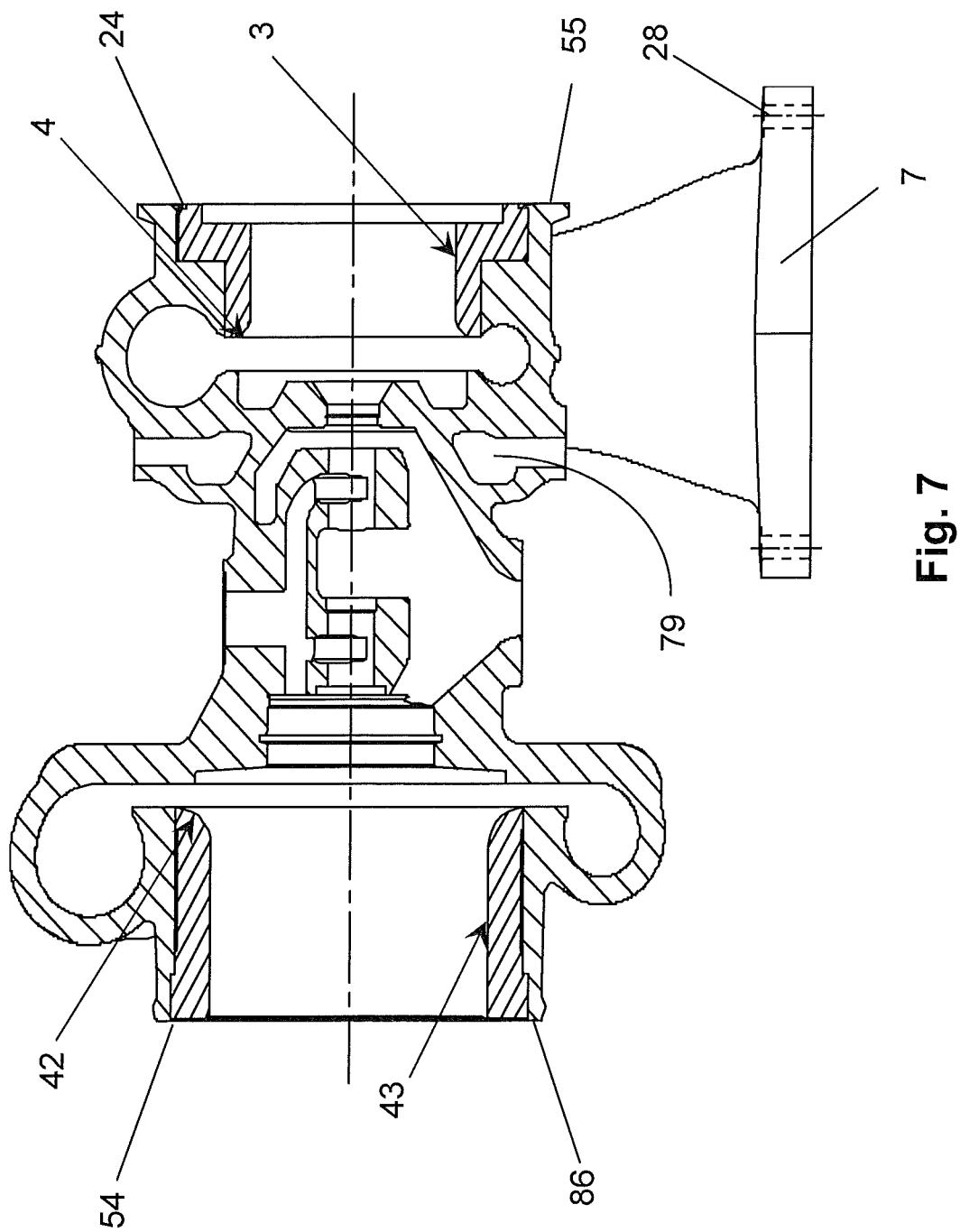
FIG. 7 depicts a section view of the housing assembly.
Figure 8B:
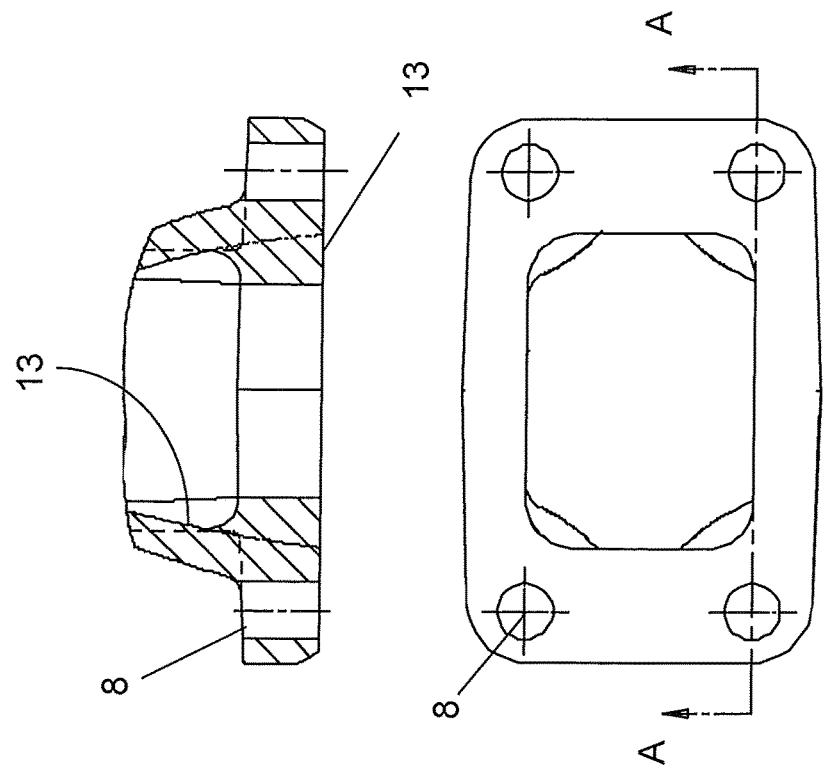
FIGS. 8A,B depict section views of a turbine foot.
Figure 8A:
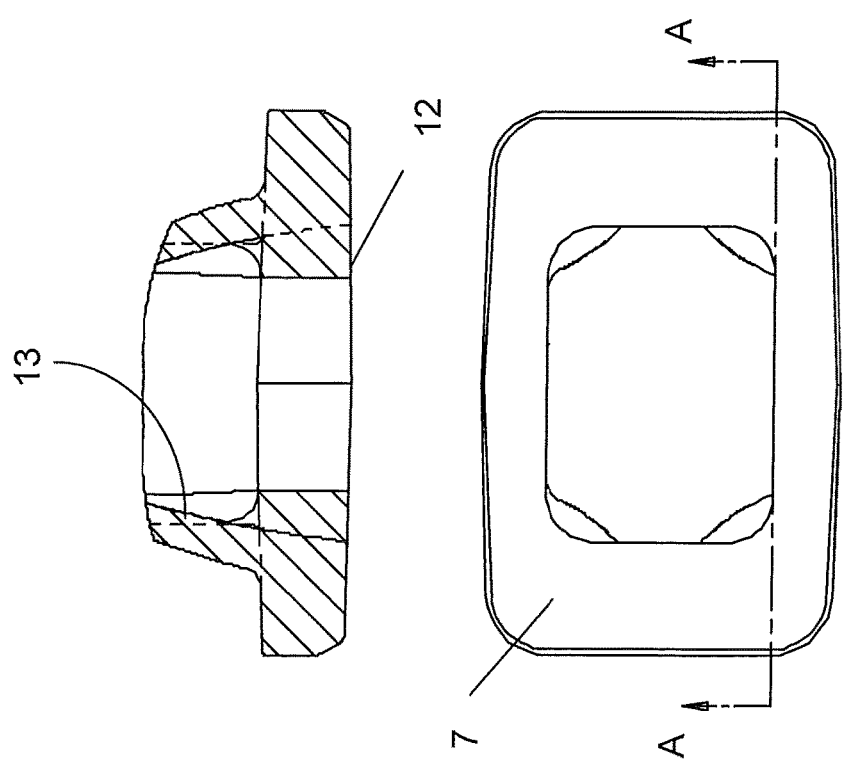

To assemble the turbocharger, the rotating assembly is assembled to the integrated housing, and the inserts are then applied and constrained. As depicted in FIG. 6, the inserts are assembled to the integrated housing and retained with any of several options. In one mode of this invention, the inserts are staked to the integrated housing. As depicted in FIG. 7, once the turbine-end insert (20) is assembled to the integrated housing, a metal deforming staking tool is applied to the turbine-end of the outboard face (55) of the integrated housing, forcing the insert against the abutment (82) and moving metal from the integrated housing to axially constrain the insert.

In a like manner, once the compressor-end insert (50) is assembled to the integrated housing, a staking tool is applied to the compressor-end of the outboard face (26) of the integrated housing, forcing the insert against the abutment (83) and moving metal from the integrated housing to axially constrain the insert.

As described above, the position and dimension, in both "X" and "Y" planes, of the mounting bolt holes in the turbine foot is a positionally critical function for details and functions both internal and external to the turbocharger. Previously, this was by machining the holes into the already cast turbine housing. The inventors realized that they could locate and incorporate mounting holes in a novel way. Using the high degree of dimensional and positional accuracy attainable with the casting techniques used for the casting of the oil galleries, the inventors produced tooling for forms which place the holes in the desired locations, with the size and orientation of said holes equally accurately positioned. Thus, the present invention eliminates the need to machine mounting bolt holes in the turbine foot.

Figure 9:
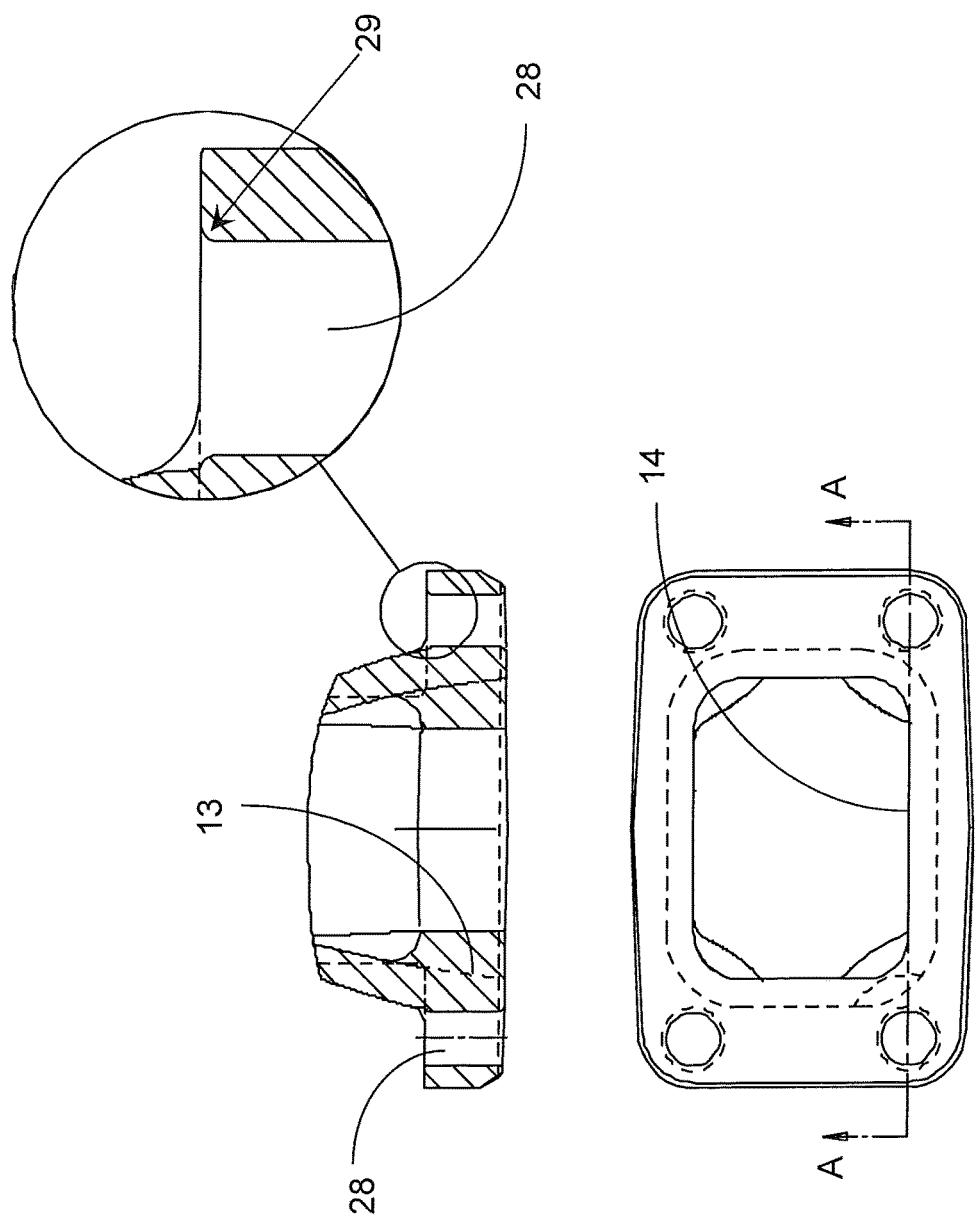
FIG. 9 depicts several views, with a magnified view of the second embodiment of the invention.

Thus, in a third embodiment to the invention, as depicted in FIG. 9, the position of the forms for the mounting holes (8) is achieved by producing a pattern which produces forms for both the gas passage (14) in the turbine foot (7) and the forms for a plurality of as-cast holes (28) in the turbine foot—the as-cast holes being dimensionally and positionally within the tolerance required of said turbine foot mounting holes (8) as if they were machined. In addition to the cylinders of the turbine foot holes (28), several as-cast features, such as the pad (30) at the top of the as-cast holes (onto which the head of a bolt, or washer plus bolt, bears on the top side of the turbine foot), and an as-cast radius (29)

at the interface of the cylindrical portion of the hole and the pad (30), are also formed. With a pattern thus formed, the foam form replicating the metal to be cast, generated in the aforementioned features in the foot of the turbocharger, can be generated and thus the features will be generated, in metal, during the metal casting stage.

In a variation to the third embodiment of the invention, instead of holes as as-cast features, the holes are cast to near net shape and will be finish machined during a later operation.

In a fourth embodiment to the invention, the material mass between the surface wetted by hot exhaust gas and the material into which the journal bearing bores are formed is reduced by the introduction of a cast air "gallery". The volume which constitutes the air gallery (79) acts not only to reduce the thermal mass in the integrated casting, but also to provide a barrier to the conductive heat path from the material wetted by the hot exhaust gas and the material which forms the journal bearings. Forms which produce the air gallery can be connected to the forms which produce the outside surface of the integrated housing and are ultimately sealed with core plugs. The volume and effectiveness of the cast air gallery (79) means that in some cases a turbine heat shield (16) may not be required. The cast air gallery is typically formed by a form or core in the shape of an annulus about the central axis of the integrated housing.

Figures 10A, 10B, 10C, 10D:
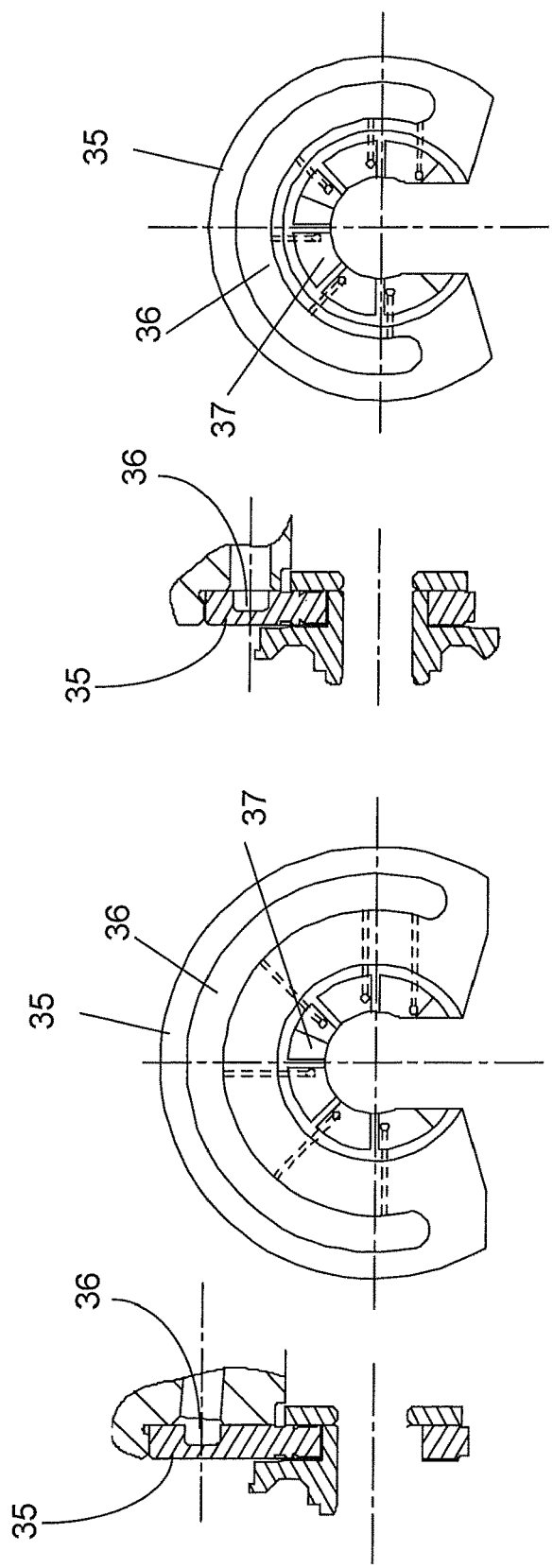
FIGS. 10A-D depict how thrust bearings can be smaller with the inventive method.

Typically, as depicted in FIGS. 10A and 10B, the configuration of the oil drillings in the bearing housing is such that the position of the drilled oil bore (68) which fluidly connects the oil inlet (61) with the thrust bearing (35), and more specifically with the distribution canal (36) in the thrust bearing, is dictated by the need to be able to physically access the area of the bearing housing face against which the thrust bearing mounts and seals so that a hole can be bored in the bearing housing and to be able to tap into the thrust bearing oil feed bore (68) for the two journal bearing oil feed bores (67). The journal bearing oil feed bores must be located so that a drill, and the tooling to support the drill, can access the journal bearing bore from both the turbine-end and the compressor-end in order to bore both the turbine and compressor oil feed bores.

By being free of these "drilling constraints", since in the formerly machined bores can now be formed as as-cast galleries, the thrust bearing oil feed gallery (78) can now be cast such that the only constraints are that the thrust bearing oil feed gallery (78) fluidly connect the oil inlet casting feature (71) with the area which becomes the thrust bearing mounting face (85). This means that the canal (36) in the thrust bearing can be placed closer to the thrust bearing pads (37), as depicted in FIGS. 10C and 10D and the outside diameter of the thrust bearing can be reduced in size. The thrust bearing oil feed bore (68) no longer has to be placed approximately in the plane of the journal bearing oil feed bores (67) so the thrust bearing oil feed gallery (78) can be formed through many different angular and radial areas (relative to the journal bearing oil feed galleries (77)). Because the thrust bearing can be smaller in overall radial size, then the bearing housing insert (38) can also be smaller in radial size since it fits into the same bore to axially constrain the thrust bearing in the bearing housing.

The method by which to construct a part such as the above integrated housing will now be explained in greater detail.

Figure 11:
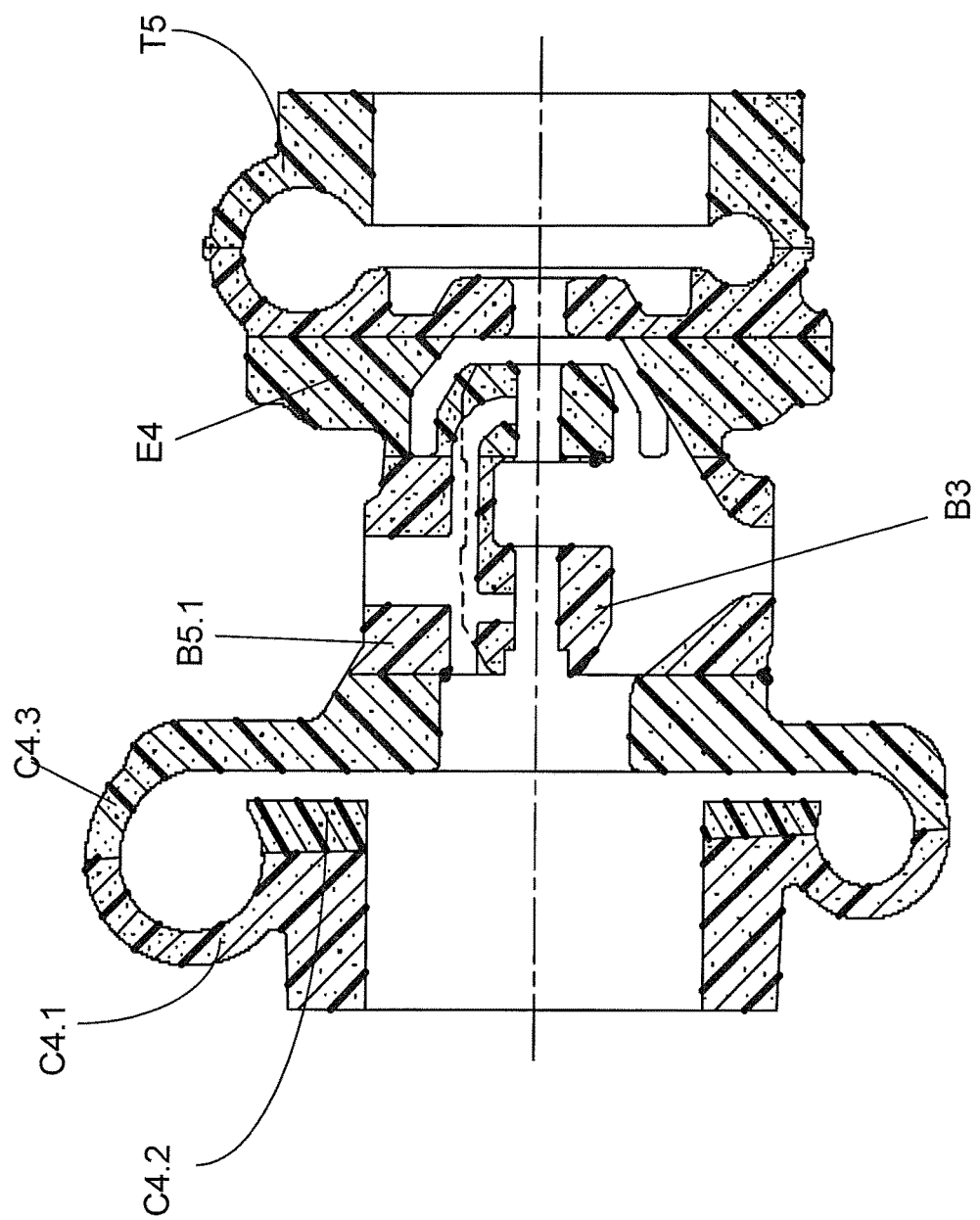
FIG. 11 depicts a foam cluster of the lost foam casting process.
Figures 12A, 12B, 12C:
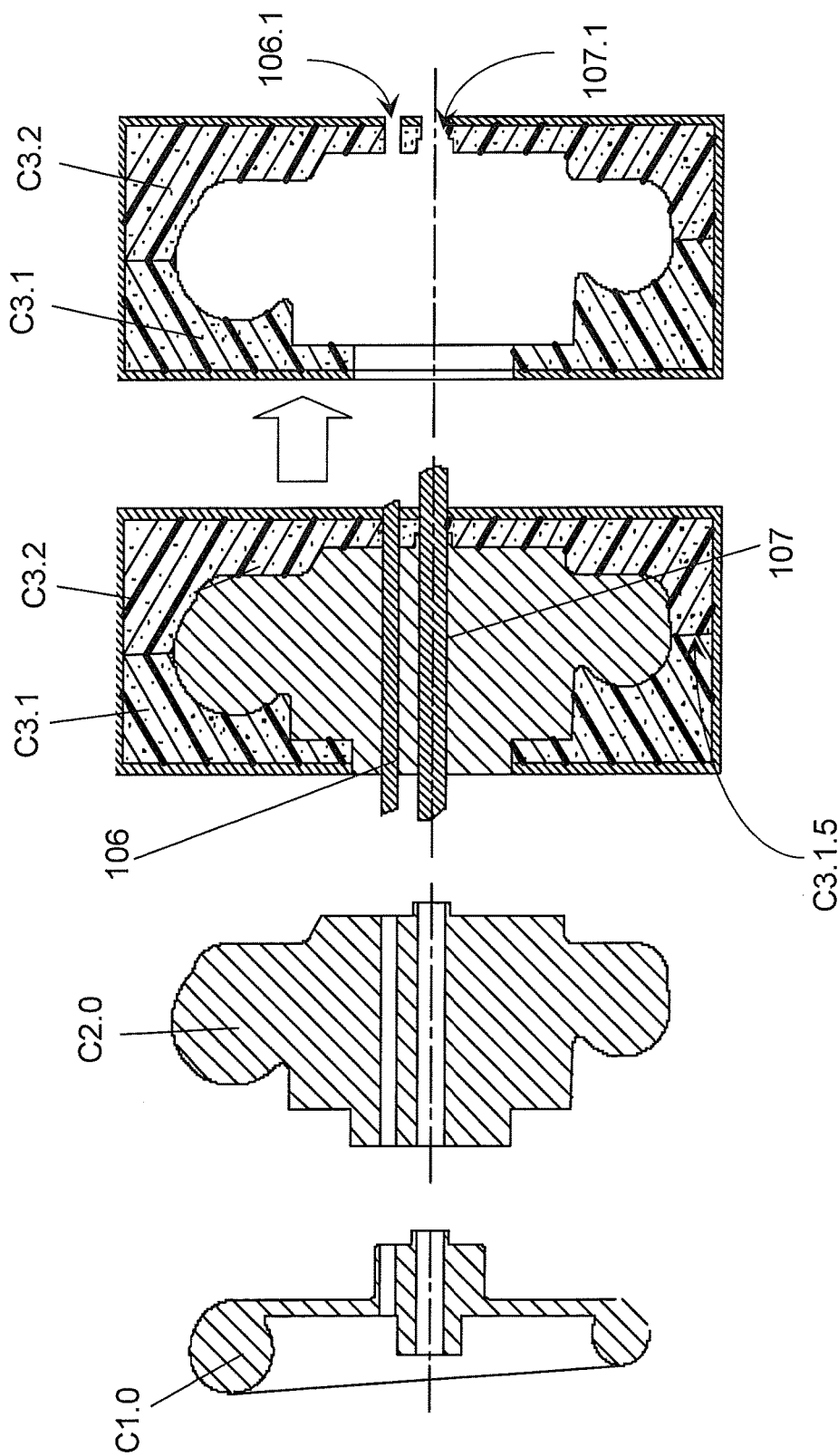
FIGS. 12A,B,C depict the first part of the process to produce a compressor cover form.

The basic lost foam process, or a variation of the lost foam process, can be used to produce the cast iron integrated housing depicted in FIG. 4. These processes are described below. In the basic lost foam process, a polystyrene foam cluster, as depicted in FIG. 11, representing the part to be cast is fabricated. The cluster is then placed in a molding box; sprues, gating and venting systems are added; and the cluster is packed in compacted, un-bonded sand and prepared for receiving the molten cast iron. The function of the compacted sand is to provide a refractory surface against which the molten metal solidifies as the molten metal displaces the foam, and to support the sprues, venting and gating systems. Molten cast iron is poured into the foam cluster, and allowed to solidify. The molten cast iron can be poured directly into the foam, which consists of approximately 97.5% air and 2.5% polystyrene, in which case the foam gasifies and is vented out. Alternatively, the foam can be pre-gasified prior to admitting the molten metal to the cluster. The now solidified unified housing casting is removed from the sand.

In a variation to this basic lost foam process, a facsimile of the inner oil galleries is formed as a ceramic shell, around which the polystyrene foam form or forms are clustered. The resulting cluster is then placed in a molding box, sprues, gating and venting systems are added, and the cluster is packed in compacted, un-bonded sand and prepared for receiving the molten cast iron. The function of the compacted sand is to provide a refractory surface against which the molten metal solidifies as the molten metal displaces the foam, and to support the sprues, venting and gating systems. Molten cast iron is poured into the foam cluster, and allowed to solidify. The now solidified unified housing casting is removed from the sand.

In yet another embodiment, a polystyrene foam cluster representing the entire part to be cast, including cavities for the oil and air galleries, is fabricated. The cluster is repeatedly coated with ceramic investment, also known as refractory coating, via dipping, brushing, spraying or flow coating and dried, until a shell is built up. The shell is allowed to dry and the process is repeated until the shell is sufficiently thick enough to withstand the thermal shock of the casting process. All the surfaces of the cluster, internal and external, including the surfaces which will become the as-cast oil and/or air galleries, are coated with the ceramic shell.

The ceramic shell provides a smooth refractory surface so that the cast part replicates the high degree of surface finish of the foam patterns and cores, compared to allowing the molten metal to solidify against relatively coarse sand. The ceramic-shelled cluster is then placed in a molding box. Sprues, gating and venting systems are added, and the cluster is packed in compacted, un-bonded sand and prepared for receiving the molten cast iron. The function of the compacted sand is simply to back up the refractory ceramic shell and to support the sprues, venting and gating systems. Molten cast iron is poured into the foam cluster, and allowed to solidify. The now solidified unified housing casting, still encapsulated in the ceramic shell, is removed from the sand, and the ceramic is broken away to reveal an integrated turbocharger housing with as-cast internal galleries contained within.

As in many foundry processes, there are multiple processes for producing all or any of tools, patterns, cores, and forms, and with the skill of the ordinary practitioner in the art, processes or components can be selected and combined for optimal casting efficiency. The following provides a discussion of the methods with some explanation of variations where the inventor deemed applicable.

To cast a unitary turbocharger housing, first the "cluster form", depicted in FIG. 11, which will define the internal galleries and all surfaces in the integrated housing, must be produced as a foam shape. It can be produced using different methods. Typically, a complicated cluster, such as the cluster depicted in FIG. 11, will consist of several sections or forms which can be separately fabricated and then bought together to interlock in some fashion or be glued together. In this example, a shaft (107), is used to hold the independent patterns (A, C4.1, C4.3, B5.1, B3, B4, T5 E4,H) and to locate the oil galleries pattern (G3). The compressor-end shaft (G2.3) of the oil gallery pattern (G3) also aids in alignment about the journal bearing shaft (107). In the interest of brevity, any reduction in size due to shrinkage has been ignored in the following discussion.

Figure 13:
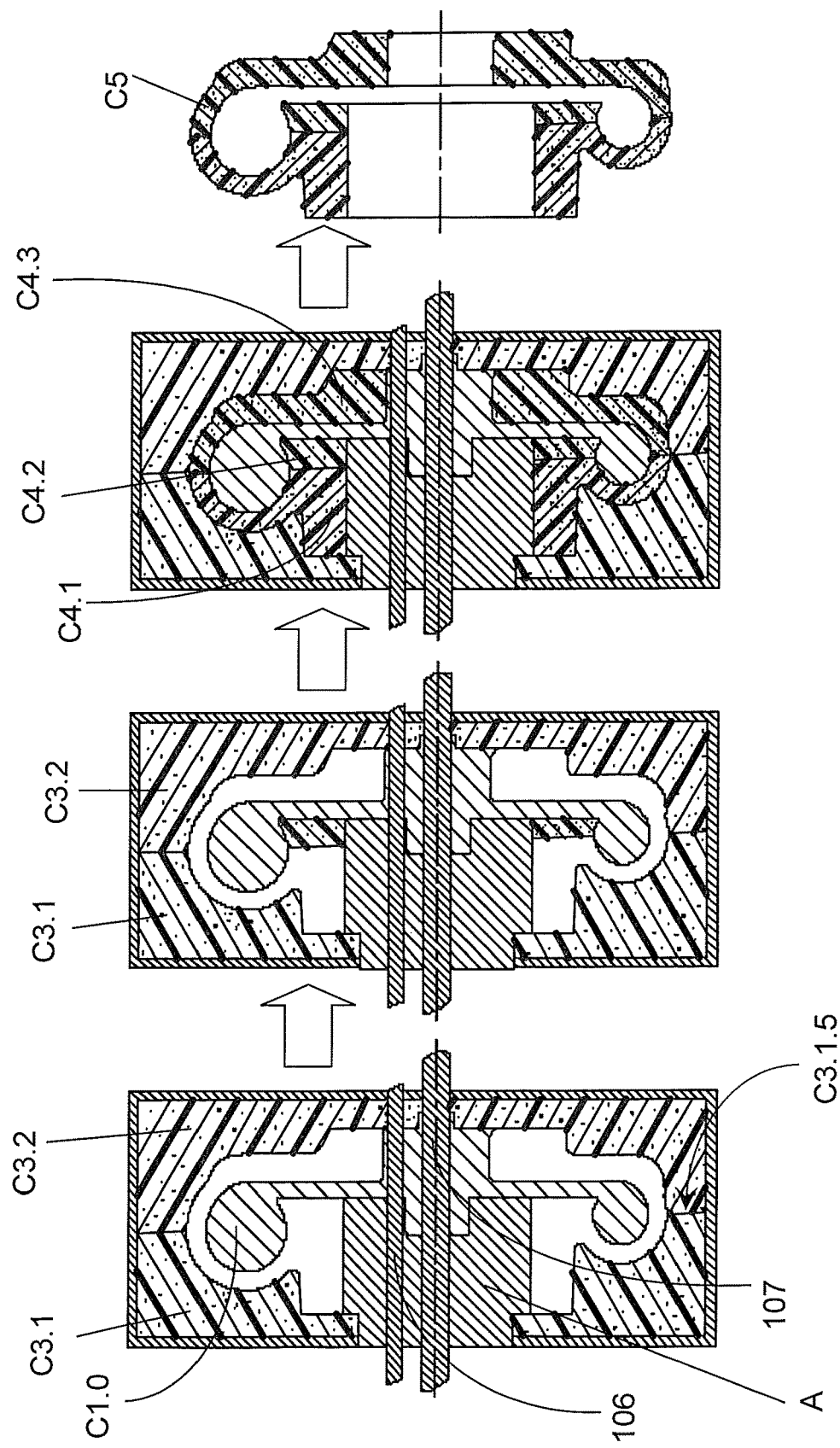
FIG. 13 depicts the last part of the process to produce a compressor cover form.

To produce a male plug (A) (FIG. 13) of the internal surfaces of the compressor inlet the most common method would be to simply turn a plug piece on a lathe. The compressor inlet plug (A), also has bores (106.1 and 107.1) which will be used in a later step to locate shafts (106,107) representing bores in the ultimate product. These bores in the plug (A) also produce the alignment of subsequent polystyrene foam forms as they are glued and assembled to produce the assembled polystyrene foam cluster depicted in FIG. 11.

As depicted in FIGS. 12A-C and 13, to produce a male plug or pattern (C1.0), representing the compressor volute (48) and associated passages, the preferred method would be to fabricate parts the surfaces (C1.0) of the volute on a milling machine, and then glue them together although in the past the various components of the pattern typically were manufactured by a patternmaker using hand tools. In a similar manner, a male plug (C2.0) representing the external surfaces of the compressor cover (47) would be fabricated. Next a series of female resin molds (C3.1, C3.2, in the example) are cast in a molding box. The patterns are removed leaving a set of reuseable resin molds which, when assembled, provide a cavity into which polystyrene foam forms are repeatedly cast. Pre-expanded beads of polystyrene foam are injected into the cavity and steam is applied to make the beads expand further, lock together and fill the cavity. When the outer and inner molds (C3.1,C3.2, C1.0) and the plug (A) are removed, what is left is a polystyrene foam cluster (C5) defining all of the inner and outer surfaces of the compressor cover part of the integrated housing. The basic exterior mold is split along a plane (C3.1.5) so that the two parts (C3.1 and C3.2) of the resin mold can be separated from the foam forms (C4.1, C4.3). As shown in FIG. 11, the compressor housing part foam form is cut and split to release volute mold part (C1.0).

Because there is a negative surface at the intersection of the exterior of the plug (A) and the inner part of the volute, which would result in an un-pullable pattern or form, a radially segmented form (C4.2) may be cast first. Then, for extraction, with a segment (C4.1) removed, the remainder of the form (C4.2) can be removed. Then a pair of forms, split along the plane (C3.1.5) are cast and removed from the molding box. The polystyrene foam forms (C4.1, C4.2 and C4.3) are glued together to produce a polystyrene foam form (C5), representing the surfaces of the compressor cover.

Figure 18:
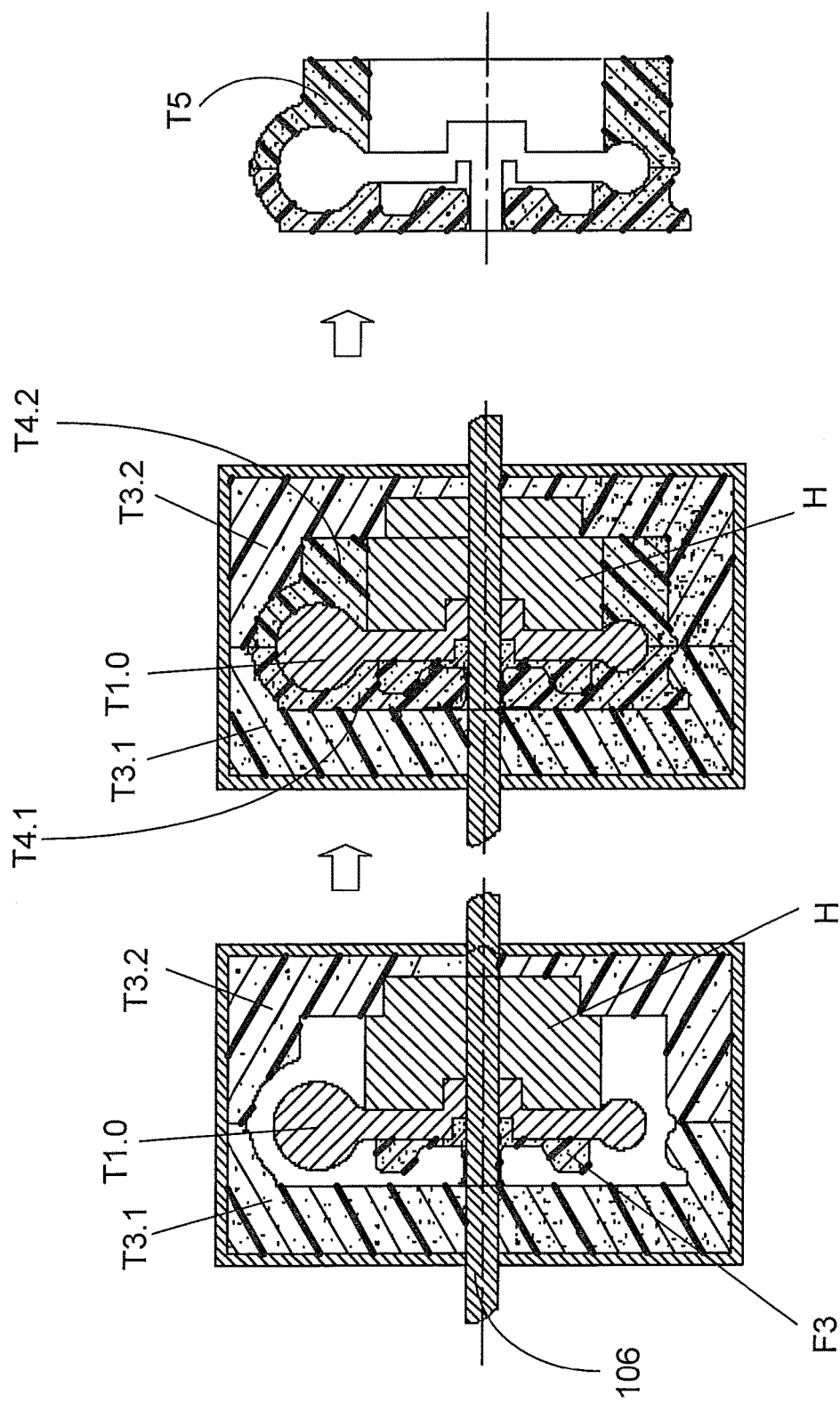
FIG. 18 depicts the process producing a turbine housing form.

The same procedure is repeated to produce the turbocharger housing foam cluster as shown in FIG. 18. Pre-expanded beads of polystyrene foam are injected into the cavity and steam is applied to make the beads expand, lock together and fill the cavity. When the outer and inner molds (T3.1,T3.2, F3) and the plug (H) are removed, what is left is a polystyrene foam cluster (T5) defining all of the inner and outer surfaces of the turbine housing part of the integrated housing. The basic exterior mold is split along a plane (T3.1.5) so that the mold parts (T3.1,T3.2, F3 and H) can be separated from the foam forms (T4.1 and T4.2). The polystyrene foam forms (T4.1 and T4.3) are glued together to produce a polystyrene foam form (T5.0), representing the surfaces of the turbine housing.

Next, as depicted in FIGS. 17A, and 17B, hollow forms defining the outer surfaces of the oil galleries are produced. As is typical with the tooling process, these cores can be fabricated in any of several ways. The core (G3) with the long vertical extension (formed in cavity G1.2) will be used in a later process and the core (G4) with the shorter vertical extension will be used in a variation of the later process. Either core could be made by either of the processes to be explained here. In the first process, as depicted in FIG. 17A, a cavity representing the desired core is machined into a pair solid blocks (G1.1) split on the axis of the compressor facing long cavity (G1.2). The blocks are brought together and foundry slurry material (G2.3) (ceramic, resin or metal) is poured into the cavity. The blocks are split apart revealing a smoothly finished, accurate facsimile (G3) of the core. The depiction in FIG. 17A is of a ceramic shelled core.

In the second process, as depicted in FIG. 17B, a male shape (G2.1), representing the desired core is machined out of solid. A pair of molding boxes (G2.2), split along the axis of the compressor facing long cavity, are brought together and a foundry casting material (e.g. resin) is cast around the male shape (G2.1). The male shape (G2.1) is removed, leaving a cavity as in the first process, described above. Foundry slurry material (G2.3) (ceramic, resin or metal) is poured into the cavity. The blocks are split apart revealing a smoothly finished, accurate facsimile (G4) of the core. The depiction in FIG. 17B is of a ceramic shelled core.

The difference between the ceramic shell produced using the method depicted in FIG. 17A, and that produced using the same method, albeit with different geometry in FIG. 17B will be explained later.

In a variation to the second step of the process, the core (G4) is constructed in a manner such that removal of a specific part unlocks the pattern and lets the elements of the core fall apart to reveal a female of the gallery surfaces (see, e.g., U.S. Pat. No. 4,880,047). This method can be done with a set of wedge shaped elements which are locked in place for the polystyrene foam injection, and then released and removed for the subsequent steps.

Figure 14A:
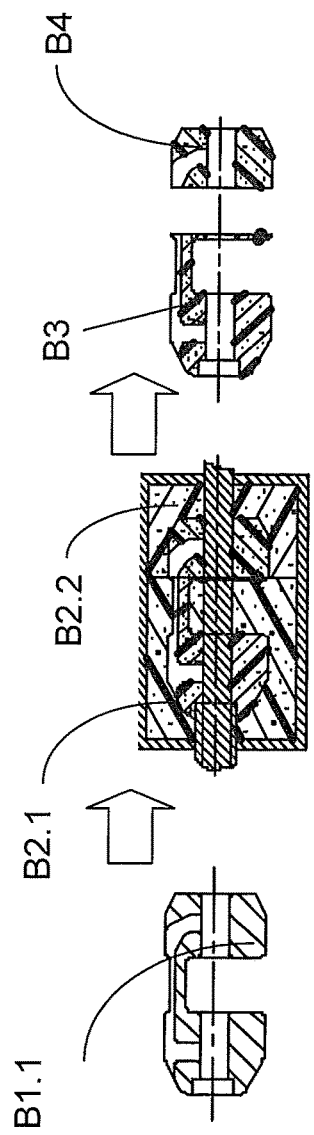
FIGS. 14A,B depict the processes producing some minor forms.
Figure 14B:
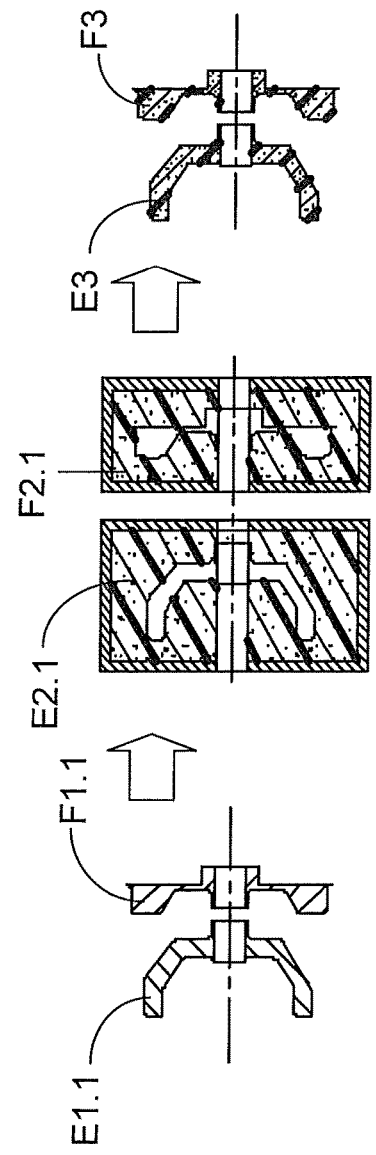

Next, the generation of forms B3, B4, E3, E4, F3 and D3 will be explained. Using processes similar to those used to generate the cores for the galleries, described above, these patterns and cores are produced. As depicted in FIG. 14, a male plug representing a part of the inner pattern (B1.1) is fabricated. Because there is a final cluster split line between B3 and B4, this plug could be made in two parts. As in the case of the core explained in FIG. 17A above, a mold with a cavity (for B2.1, B2.2) is cast. The mold (for B2.1, B2.2) is split along a plane of the axis of the plug (B1.1) so the plug can be removed from the cast mold. The mold can also be split perpendicular to the plane of the axis so that the parts (B3, B4) from this mold can be cast and removed serially. These parts (B3, B4) will be used for the formation of foam forms in later steps.

In a like manner, the forms for the air spaces (E3, F3) are produced. In the example depicted in FIG. 14, the plugs (E1.1, F1.1) are made separately and cast independently in mold boxes (E2.1, F2.1). As was explained above, for the formation of forms B3 and B4, the mold box could be split perpendicular to the axis and the parts molded serially.

Figure 15:
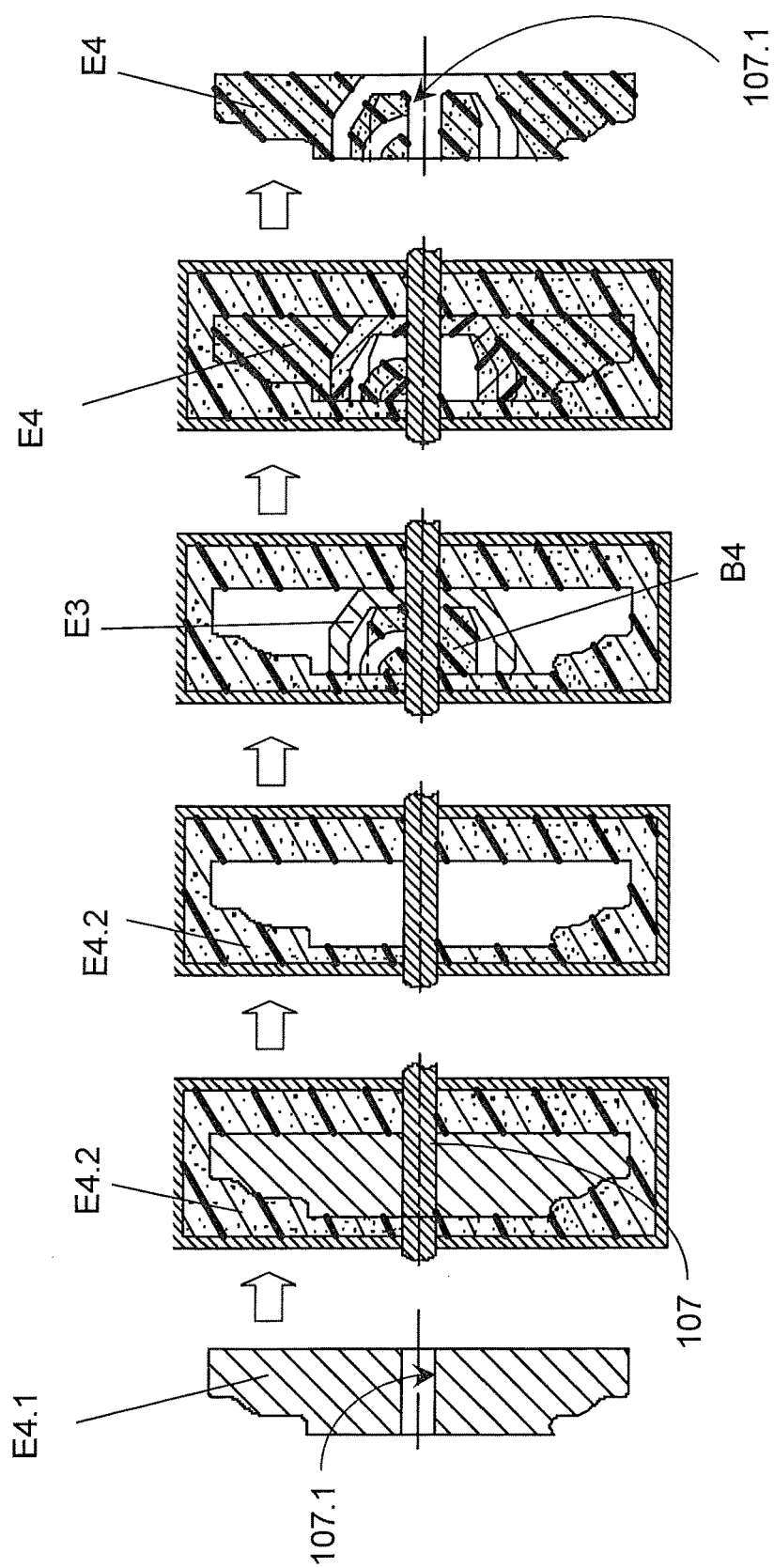
FIG. 15 depicts the process producing more minor forms.

Next, the formation of the form E4 will be explained. As depicted in FIG. 15, a plug (E4.1) is fabricated with a bore (107.1) for reception of the common axial shaft (107). An outside shape mold (E4.2) is cast around the plug (E4.1), with a shaft (107) in place. The plug (E4.1) is removed to reveal a cavity. Into the cavity the previously fabricated cores B4 and E3 are located. Pre-expanded beads of polystyrene foam are injected into the cavity and steam is applied to make the beads expand further, lock together and fill the cavity. When the small cores are removed a polystyrene form (E4),with appropriate internal cavities remains. A like method for a form which will produce the center of the bearing housing details and features is produced. As depicted in FIGS. 16A and 16B, a plug (B5.0) is fabricated to establish the outside surfaces of this part of the housing. The plug contains protruding features (5.0.1, 5.0.2) which will be used to locate cores during a later step. A split mold (5.0.3) is cast around the plug (5.0) and the plug is removed from the cast mold. A dummy shaft 1.7.2, containing addition shaft features is set in the split mold. The previously made gallery core (G3), and a core representing the cavity around the oil drain in the bearing housing are also set in the split mold. Pre-expanded beads of polystyrene foam are injected into the cavity and steam is applied to make the beads expand further, lock together and fill the cavity. When the dummy shaft and the cores are removed, a polystyrene form (B5.1), with appropriate internal cavities remains.

A refractory slurry, typically ceramic, is introduced into the void in the assembled molding box, applied to all surfaces by rotating the molding box, and allowed to dry. The process is repeated until the ceramic shell (G2.3) is thick enough to withstand the thermal shock and pressure generated during the introduction of molten metal to the cluster during a later step in the process. Now there is a hollow ceramic core (G2.3), with an outside surface which represents the ultimate core (G3, or G4). When the molding box is dismantled, the ceramic shelled core (G3 or G4) can be removed to be used in subsequent steps.

In a variation to the above process, because the repeated application and drying of the ceramic slurry is time consuming, a thinner shell can be produced and the thin shell can be backed up by either sand or polystyrene foam, filling the cavity within the ceramic shell. As long as the filler material of the core can be easily removed after casting to allow the ceramic shell to collapse and be removed post casting of the molten metal.

Basic Lost Foam Process

Figure 20B:
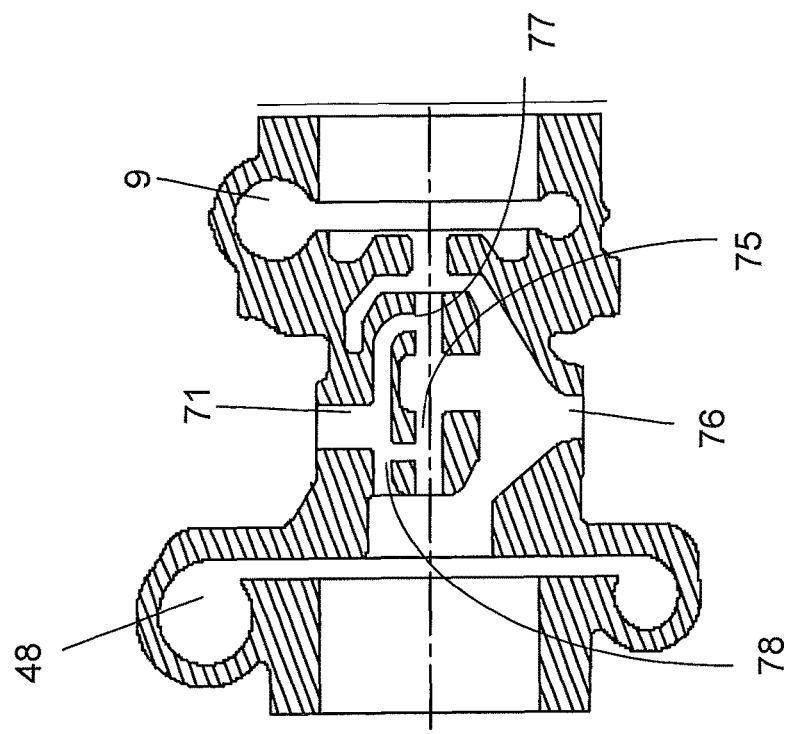
FIGS. 20A,B depict the process for an alternative method for casting the integrated housing casting.
Figure 20A:
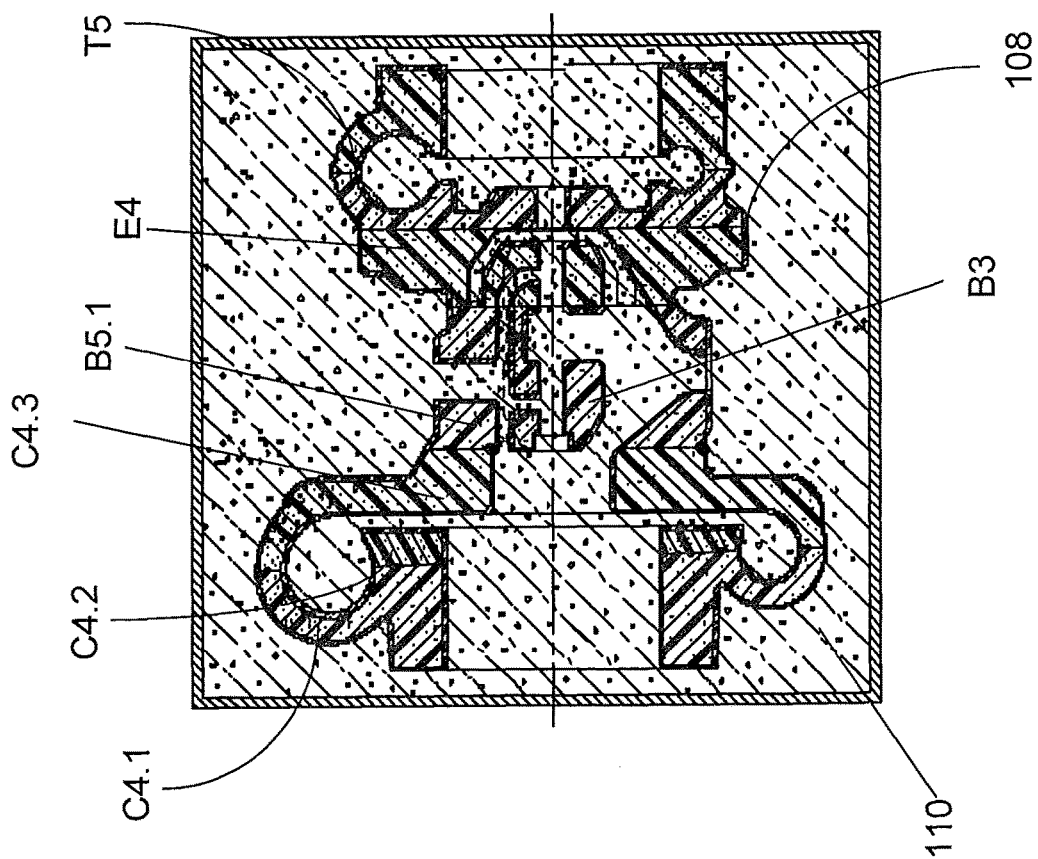

As depicted in FIG. 19A, the various forms and patterns (C4.1, C4.2, C4.3, B5.1, B3, B4, T5, E4) are brought together. The oil gallery surfaces are formed inside the various foam forms (C4.1, C4.2, C4.3, B5.1, B3, B4, T5, E4). The oil gallery surfaces are now inwards facing surfaces. The polystyrene cluster, along with the compressor and turbine end plugs (A and H) are located on the shafts (107) and 106 and are glued together, capturing the ceramic facsimile (G3) of the oil galleries. Once glued together, the male plugs (A and H), and the shaft (107) are removed leaving a doped unitiary polystyrene cluster. Foundry tools such as runners, sprues, and vents, are added and the polystyrene foam cluster is then doped, set in a molding box, sand (110) is packed and concentrated around the cluster as depicted in FIG. 20A. Molten metal is poured into the foam core, vaporizing the polystyrene foam. In a variation to this process, the foam can be liquefied and evaporated and then the molten metal is poured in to the void vacated by the vaporized foam.

The solidified cast iron casting is removed from the sand in the molding box, revealing a cast integrated turbocharger housing complete with as-cast oil galleries (77, 78), journal bearing bore (75), an oil inlet (71), and oil drain (76). The inwards facing surface of the molten metal solidifies against an outwards facing packed sand surface, resulting in an accurate geometric facsimile of the oil galleries albeit with a relatively rough surface finish (that of foundry sand) of the oil galleries.

Oil Galleries Inside Basic Lost Foam, with Ceramic Shell

Figure 21B:
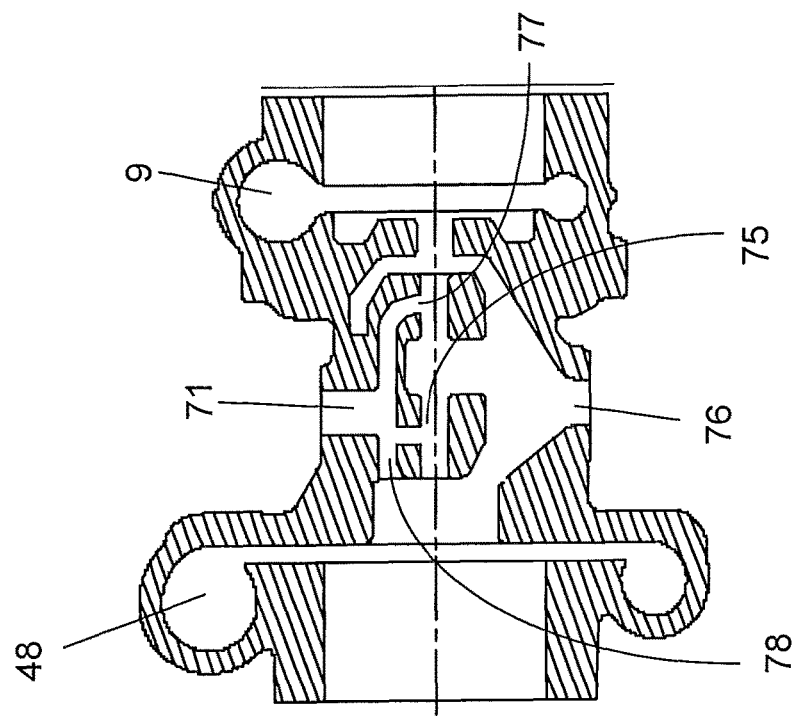
FIGS. 21A,B depict the process for another alternative method for casting the integrated housing casting.
Figure 21A:
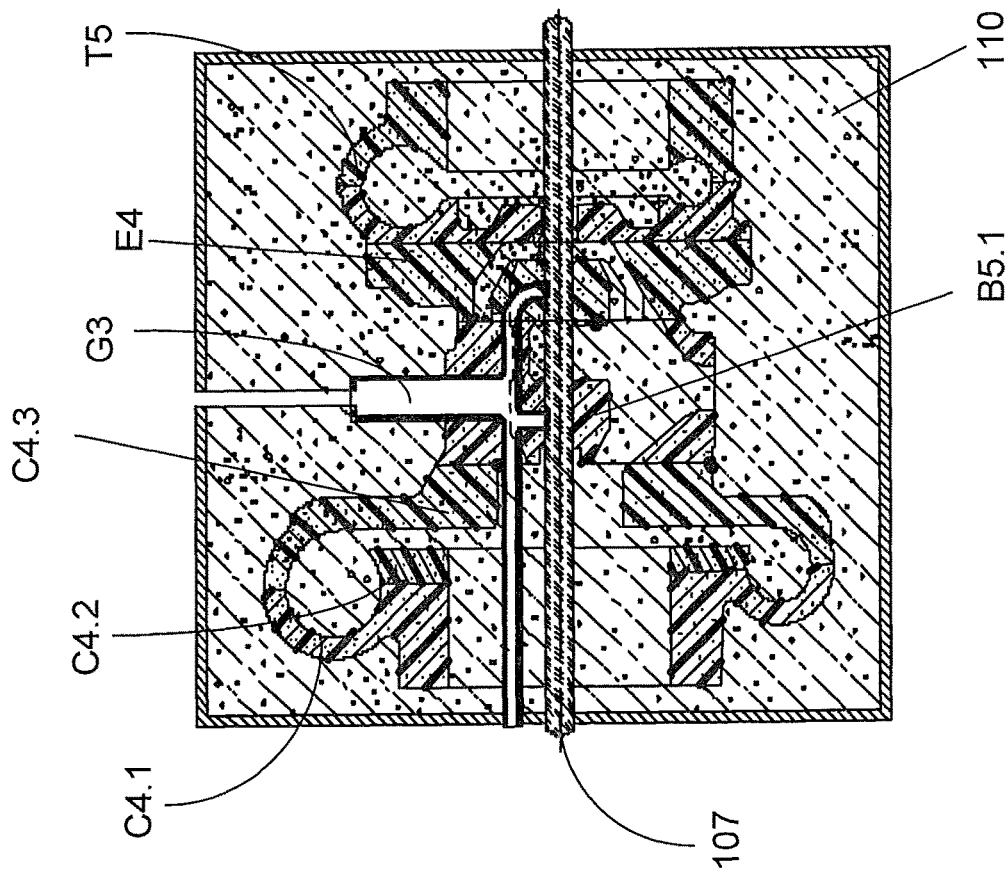

In a modified LFC process, as depicted beginning with FIG. 20A, the various forms and patterns (C4.1, C4.2, C4.3, B5.1, B3, B4, T5, E4) are brought together. The oil gallery surfaces are present inside the various foam forms (C4.1, C4.2, C4.3, B5.1, B3, B4, T5, E4) representing the oil galleries to form the cluster. The oil gallery surfaces are now inwards facing surfaces of foam. The polystyrene cluster, along with the compressor and turbine end plugs (A and H) are located on the shafts (107) and 106 and are glued together. Once glued together, the male plugs (A and H), and the shaft (107) are removed leaving a unitary polystyrene cluster. Foundry tools such as runners, sprues, and vents, are added and the polystyrene foam cluster is then repeatedly dipped in a ceramic slurry and dried until a ceramic shell is thick enough to withstand the thermal shock and pressure generated during the introduction of molten metal to the cluster during a later step in the process. The ceramic shell encapsulates all surfaces of the polystyrene foam cluster including the inwards facing facsimiles of the oil galleries. The ceramic shelled polystyrene foam cluster is set in a molding box and sand (110) is packed and concentrated around the ceramic shelled cluster as depicted in FIG. 21A. Molten metal is poured into the foam core, vaporizing the polystyrene foam. In a variation to this process, the foam can be liquefied and evaporated and then the molten metal is poured in to the void vacated by the vaporized foam.

The solidified cast iron casting, with its ceramic shell, is removed from the sand. The ceramic shell is broken away and removed, revealing a cast integrated turbocharger housing complete with as-cast oil galleries (77, 78), journal bearing bore (75), an oil inlet (71), and oil drain (76). Because the smooth surfaced inwards facing surfaces of the galleries within the foam form were formed by expanding polystyrene foam beads against a smooth core, the inwards facing surfaces of the galleries have as good a surface finish as can be obtained with polystyrene foam compressed against a smooth core.

In a further variation to the method described above, a ceramic shell (G4), representing the galleries is left in the polystyrene foam cluster and this gallery ceramic shell and the foam cluster is coated in the ceramic slurry, dried etc. While this may seem overkill, the accuracy and surface finish required of the process may drive this variation. (i.e. if high surface finish of the oil gallery surfaces is required, then this variation to the process could provide it.) Because the outwards facing surface of the oil galleries (G4) was formed against a smooth core, this surface finish will be replicated in the metal casting step of the process so the oil galleries will have a surface finish superior to that of the third step of the process (i.e. metal formed against sand), and also superior to first variation of the third step of the process (i.e. metal formed against a ceramic shell still exhibiting artifacts of foam beads in the surface)

Ceramic Galleries Placed in Foam Cluster

For a still higher degree of surface finish, and a higher assurance of less core shift relative to the oil galleries, the various forms and patterns (C4.1, C4.2, C4.3, B5.1, B3, B4, T5, E4 and G3) are brought together to form the cluster depicted in FIG. 21A. This cluster uses the oil gallery core (G3) of FIG. 17A, which is a smooth surfaced ceramic shelled facsimile of the oil galleries in which the ceramic surfaces representing the oil galleries are outwards facing. The upwards stem of this oil gallery core is extended so sand can be injected into the core to back up the shell in case the shell is fragile. The polystyrene clusters, along with the compressor and turbine end plugs (A and H) are located on the shafts (107) and (106) and are glued together, capturing the ceramic facsimile (G3) of the oil galleries. Once glued together, the male plugs (A and H) are removed leaving a unitary polystyrene cluster, with a metal or ceramic shaft (106) located within. The shaft (107) not only locates the foam forms, but provides an outwards facing, accurate, smooth surface for the regions of the journal bearing bore not defined by the ceramic oil gallery core (G3). Foundry tools such as runners, sprues, and vents, are added and the polystyrene foam cluster is then set in a molding box. Sand (110) is packed and concentrated around the polystyrene foam cluster, as depicted in FIG. 19A. Molten metal is poured into the foam core, vaporizing the polystyrene foam, and the metal is allowed to solidify. In a variation to this process, the foam can be liquefied and evaporated and then the molten metal is poured in to the void vacated by the vaporized foam. The solidified cast iron casting is removed from the sand which surrounded it in the molding box. The ceramic shell (G3), defining the inner oil galleries, is broken away and removed, revealing a cast integrated turbocharger housing complete with as-cast oil galleries (77, 78), journal bearing bore (75), an oil inlet (71), and oil drain (76). The surface finish, accuracy and placement of the oil galleries is at the highest level using this process.

In an alternative to the generation of the foam cluster part of the processes described above, and a process very typical of the contemporary lost foam process, the polystyrene foam cluster consisting in prior embodiments of the invention (C4.1, C4.2, C4.3, B5.1, B3, B4, T5, E4), is developed as two halves, split along a vertical plane, so that the voids defining the surfaces of the internal oil galleries can be fabricated into the surfaces of the vertical planar split. Each half of the "galleries" is in one of the halves of the polystyrene foam form. When the two halves of the polystyrene foam form are glued together, the cavity of the gallery patterns fluidly connects the cavity of the journal bearing bore with the cavity of the oil inlet and the area, which would locate the thrust bearing.

While numerous methods have been described, the end product is the same—a bearing housing or turbocharger housing with cast-in galleries.

We claim:

1. A method of manufacturing a turbocharger housing for housing rotating elements of a turbocharger, the method comprising:
   preparing a one-piece fugitive positive pattern of the turbocharger housing defining bearing surfaces including radial journal bearing surfaces for radially supporting first and second journal bearings and an axial thrust bearing surface for opposing an axial thrust bearing, the positive pattern further defining a common oil inlet (71) and oil internal passageways for delivering oil from the common oil inlet (71) to the first and second radial journal bearing surfaces and axial thrust bearing surface,
   forming a negative refractory mold around said one-piece fugitive positive pattern, and
   casting metal into the negative refractory mold to produce a one-piece cast turbocharger housing having the oil internal passageways defined therein.

2. The method of claim 1, wherein said fugitive positive pattern defines a one-piece turbocharger housing including a turbine housing for housing a turbine wheel, a bearing housing, and a compressor cover for housing a compressor wheel.

3. The method of claim 1, wherein said fugitive positive pattern defines a turbocharger bearing housing adapted for mating to a turbocharger turbine housing and a turbocharger compressor cover.

4. The method of claim 1, wherein said oil internal passageway exhibits a curved path.

5. The method of claim 4, wherein said curved path is defined by a simple curve or a compound curve.

6. The method of claim 1, wherein at least a part of said fugitive positive pattern is formed of a polymeric foam.

7. The method of claim 6, wherein a ceramic shell is formed around at least a part of said polymeric foam form prior to metal casting.

8. The method as in claim 7, wherein a ceramic shell is formed around the polymeric foam form not associated with sprues, runners and vents.

9. The method of claim 8, wherein the polymeric foam form defining said turbine housing section includes a foot, wherein said foot includes bores adapted to receive bolts for securing the turbine housing to an engine manifold.

10. The method of claim 1, wherein a ceramic shell (G3, G4) is formed, an outer surface of which defines the oil internal passageway, and wherein the ceramic shell is provided within the fugitive positive pattern prior to casting.

11. A method of manufacturing an integrated turbocharger housing, the method comprising:
   forming positive foam forms, each positive foam form constituting a part of a turbocharger housing,
   joining the positive foam forms to form a one-piece fugitive positive pattern defining a turbocharger housing including a turbine housing section, a bearing housing section, and a compressor cover section, the bearing housing section including an axial thrust surface for opposing an axial thrust bearing and first and second radial journal surfaces for radially supporting first and second journal bearings, the fugitive positive pattern further defining a common oil inlet (71) and oil internal passageways for delivering oil from the common oil inlet (71) to the first and second radial journal bearing surfaces and axial thrust bearing surface,
   forming a negative refractory mold around said one-piece fugitive positive pattern, and
   displacing said one-piece fugitive positive pattern and then casting metal into the refractory mold, or casting metal into the refractory mold simultaneous with displacing said fugitive positive pattern, to produce the integrated turbocharger housing including the bearing housing section having the axial thrust surface for a thrust bearing, the first and second radial journal surfaces for first and second journal bearings and said oil internal passageways connecting said oil inlet with said axial thrust surface and said first and second radial journal surfaces defined therein.

* * * * *